US012019394B2

(12) United States Patent
Sawada et al.

(10) Patent No.: US 12,019,394 B2
(45) Date of Patent: Jun. 25, 2024

(54) TONER, DEVELOPER, TONER SET, TONER RECEIVING UNIT, IMAGE FORMING APPARATUS, AND IMAGE FORMING METHOD

(71) Applicants: Toyoshi Sawada, Shizuoka (JP); Kazumi Suzuki, Shizuoka (JP); Katsunori Kurose, Shizuoka (JP); Akihiro Kaneko, Kanagawa (JP); Motoshi Iizuka, Shizuoka (JP)

(72) Inventors: Toyoshi Sawada, Shizuoka (JP); Kazumi Suzuki, Shizuoka (JP); Katsunori Kurose, Shizuoka (JP); Akihiro Kaneko, Kanagawa (JP); Motoshi Iizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 17/459,134

(22) Filed: Aug. 27, 2021

(65) Prior Publication Data

US 2022/0066344 A1 Mar. 3, 2022

(30) Foreign Application Priority Data

Sep. 1, 2020 (JP) ................................ 2020-146620

(51) Int. Cl.

*G03G 9/087* (2006.01)
*G03G 9/097* (2006.01)
*G03G 15/20* (2006.01)

(52) U.S. Cl.

CPC ..... *G03G 9/09733* (2013.01); *G03G 9/08704* (2013.01); *G03G 15/201* (2013.01)

(58) Field of Classification Search

None
See application file for complete search history.

(56) References Cited

U.S. PATENT DOCUMENTS

| | | | |
|---|---|---|---|
| 5,851,713 | A | 12/1998 | Hayashi et al. |
| 7,252,708 | B2 | 8/2007 | Aoyama et al. |
| 9,996,017 | B2 | 6/2018 | Shiral et al. |
| 10,564,571 | B2 | 2/2020 | Suzuki et al. |

(Continued)

FOREIGN PATENT DOCUMENTS

| | | |
|---|---|---|
| EP | 3438182 | 2/2019 |
| JP | H07114208 | 5/1995 |

(Continued)

OTHER PUBLICATIONS

U.S. Appl. No. 16/959,478, filed Dec. 26, 2018.
Extended European Search Report dated Dec. 17, 2021 in European Application No. 21193608.3, 7 pages.

*Primary Examiner* — Peter L Vajda
*Assistant Examiner* — Charles Collins Sullivan, IV
(74) *Attorney, Agent, or Firm* — Grüneberg and Myers PLLC

(57) ABSTRACT

A toner includes polyolefin and has an exothermic peak in a range from 40° C. to 70° C. in a cooling process of the polyolefin by the DSC after a first heating process of the polyolefin by DSC. The polyolefin does not have an exothermic peak in the cooling process of the polyolefin by the DSC after the first heating process of the polyolefin by the DSC, and has an exothermic peak in a range from 0° C. to 30° C. in a second heating process of the polyolefin by the DSC.

14 Claims, 3 Drawing Sheets

(56) References Cited

U.S. PATENT DOCUMENTS

| | | | | |
|---|---|---|---|---|
| 10,599,059 | B2 | 3/2020 | Kaneko et al. | |
| 10,620,557 | B2 | 4/2020 | Sawada et al. | |
| 2004/0058266 | A1* | 3/2004 | Matsumura ........ | G03G 9/08704 430/110.2 |
| 2007/0077509 | A1* | 4/2007 | Okahata ............. | G03G 9/09708 430/108.1 |
| 2013/0244011 | A1* | 9/2013 | Sabu .................. | G03G 9/08795 428/206 |
| 2020/0333720 | A1 | 10/2020 | Sawada et al. | |
| 2020/0363743 | A1 | 11/2020 | Nakajima et al. | |
| 2022/0128917 | A1 | 4/2022 | Shu et al. | |

FOREIGN PATENT DOCUMENTS

| | | |
|---|---|---|
| JP | 2005-120367 | 5/2005 |
| JP | 2017025127 | 2/2017 |
| JP | 2017-144698 | 8/2017 |
| JP | 2018-005225 | 1/2018 |
| JP | 2020-177084 | 10/2020 |

* cited by examiner

TONER, DEVELOPER, TONER SET, TONER RECEIVING UNIT, IMAGE FORMING APPARATUS, AND IMAGE FORMING METHOD

CROSS-REFERENCE TO RELATED APPLICATION

The present disclosure claims priority under 35 U.S.C. § 119 to Japanese Patent Application No. 2020-146620, filed Sep. 1, 2020, the contents of which are incorporated herein by reference in their entirety.

BACKGROUND OF THE INVENTION

1. Field of the Invention

The disclosures herein generally relate to a toner, a developer, a toner set, a toner receiving unit, an image forming apparatus, and an image forming method.

2. Description of the Related Art

Electrophotographic image forming apparatuses using toners are widely used in various places such as offices. Toners used in such image forming apparatuses are required to have a low temperature fixing property in order to reduce energy consumption during the fixing process processes.

As a toner with an improved low temperature fixing property, for example, a toner for electrostatic latent image development is disclosed which includes a bonding resin containing a crystalline polyester resin and a release agent, in which an endothermic peak top temperature at a time of heating the toner for electrostatic latent image development by differential scanning calorimetry (DSC) is 70° C. or higher, and a calorific value ΔHc (L) of a part lower than an exothermic peak top temperature rc by 7° C. or more, is 15% or less of the calorific value ΔHc of the entire exothermic peak at a time of cooling the toner for electrostatic latent image development by the DSC (See, for example, Japanese unexamined patent application publication No. 2005-120367).

SUMMARY OF THE INVENTION

Problem to be Solved by the Invention

An aspect of the present invention aims at providing a toner having an excellent fixing property and an excellent image fastness for a plastic film.

Means for Solving the Problem

According to an aspect of the present disclosure, a toner includes polyolefin and has an exothermic peak in a range from 40° C. to 70° C. in a cooling process of the polyolefin by the DSC after a first heating process of the polyolefin by the DSC, the polyolefin not having an exothermic peak in the cooling process of the polyolefin by the DSC after the first heating process of the polyolefin by the DSC and the polyolefin having an exothermic peak in a range from 0° C. to 30° C. in a second heating process of the polyolefin by the DSC.

Effects of the Invention

According to an aspect of the present disclosure, a toner having an excellent fixing property and an excellent image fastness for a plastic film can be provided.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENT

Figure 1:
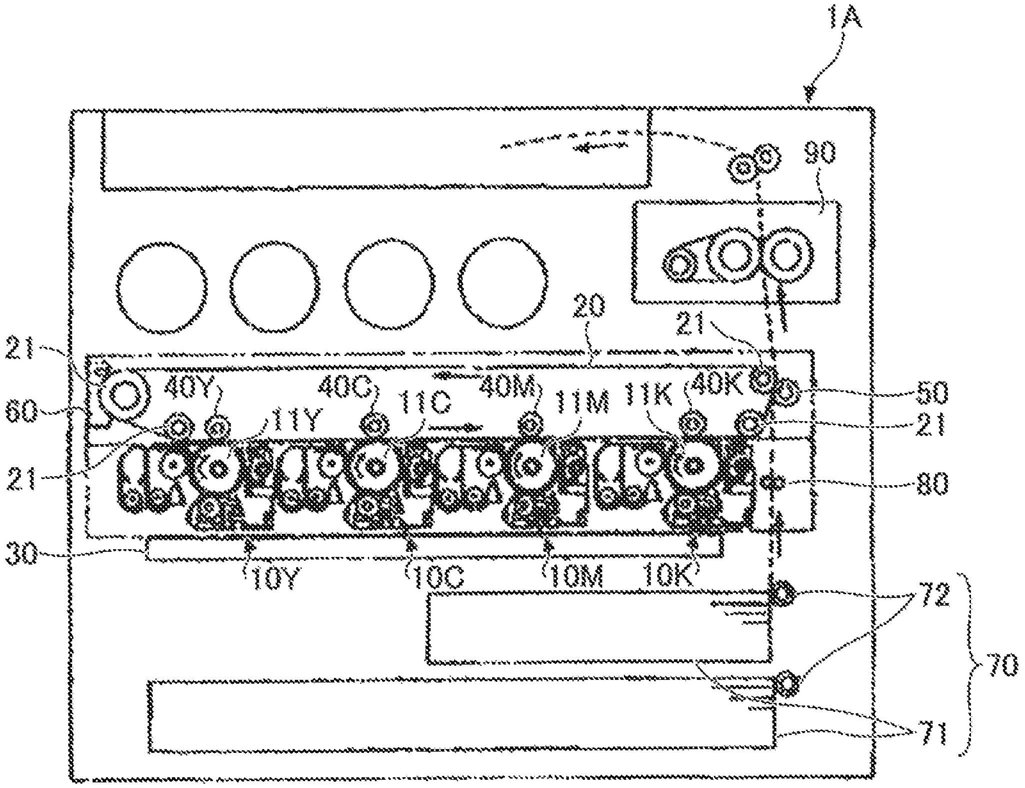
FIG. 1 is a schematic view illustrating an example of an image forming apparatus according to the embodiment of the present disclosure.

In the following, embodiments of the present disclosure will be described in detail. The embodiment is not limited to the following descriptions, but may appropriately vary without departing from the scope recited in claims. Moreover, in the specification, a hyphen (-) representing a numerical range indicates that values before and after the hyphen are included as a lower limit value and an upper limit value, respectively, unless otherwise indicated.

<Toner>

A toner according to the embodiment of the present disclosure contains polyolefin as a bonding resin (fixing resin). The toner has an exothermic peak that falls within a range from 40° C. to 70° C. in a cooling process of the polyolefin by the DSC after the first heating process of the polyolefin by the DSC. The polyolefin does not have an exothermic peak in the cooling process of the polyolefin by the DSC after the first heating process of the polyolefin by the DSC, and has an exothermic peak that falls within the range from 0° C. to 30° C. in the second heating process of the polyolefin by the DSC.

In the toner for electrostatic latent image development disclosed in Japanese unexamined patent application publication No. 2005-120367, fixing of the toner to a printing medium other than a paper medium is not studied. As electrophotographic image forming apparatuses become popular, various types of printed matter have appeared. Thus, there is a growing need for printing on plastic films used for packaging materials of foodstuffs, in addition to paper media. In addition, because plastic films have flexibility, it is important to prevent defects such as peeling of printed images when the plastic films are bent or deformed from occurring.

The inventors of the present disclosure focused on, regarding the toner containing polyolefin as a bonding resin, a temperature range of an exothermic peak appearing in a cooling process of the polyolefin by the DSC after the first heating process of the toner by the DSC, and a temperature range of an exothermic peak appearing in the second heating process of the polyolefin by the DSC. The inventors have found that the toner has a low melting point and becomes difficult to be crystallized, and the fixing property of the toner to a plastic film is greatly enhanced, when an exothermic peak appears within a range from 40° C. to 70° C. in the cooling process of the polyolefin by the DSC after the first heating process of the toner by the DSC, an exothermic peak does not appear in the cooling process of the polyolefin by the DSC after the first heating process of the polyolefin by the DSC, and an exothermic peak appears within a range from 0° C. to 30° C. in the second heating process of the polyolefin by the DSC.

Plastic films are non-paper media other than paper media. Plastic films include polyethylene films, polypropylene films, polyethylene terephthalate films, vinyl chloride resin films, polystyrene films, acrylic films, polycarbonate films, polyphenylene sulfide films, fluororesin films, polyether ether ketone films, polyether sulfone films, aramid films, polyimide films, triacetate films, and the like. Plastic films also include films, in which surfaces are subjected to surface coating treatments with different materials.

The exothermic peak appearing in the cooling process of the polyolefin by the DSC after the first heating process of the toner by the DSC preferably falls within a range from 40° C. to 70° C., more preferably falls within a range from 45° C. to 70° C., and further preferably falls within a range from 50° C. to 70° C. When the exothermic peak appearing in the cooling process of the polyolefin by the DSC after the first heating process of the toner by the DSC is lower than 40° C., the toner is liable to aggregate due to a temperature change during a transportation of the toner or under a storage environment. Then, solidification of the toner in a toner bottle and adhesion of the toner in a developing device easily occur. In addition, replenishment failures due to toner clogging in the toner bottle and image abnormalities due to toner adhesion in the developing device are likely to occur. On the other hand, when the exothermic peak appearing in the cooling process of the polyolefin by the DSC after the first heating process of the toner by the DSC exceeds 70° C., the toner easily crystallizes.

The toner according to the embodiment of the present disclosure includes a bonding resin as described above. In addition to the bonding resin, the toner according to the embodiment may contain another component, such as a colorant, or a release agent, as necessary.

[Bonding Resin]

Bonding resins include polyolefins as described above. The toner according to the embodiment of the present disclosure may contain a bonding resin other than polyolefin.

(Polyolefin)

The polyolefin contained in the toner according to the embodiment of the present disclosure is preferably a maleic acid modified polyolefin having at least a polypropylene block in a main chain.

(Structure, Content, Melting Point, Weight Average Molecular Weight and Maleic Acid Modification Rate of Maleic Acid Modified Polyolefin with Polypropylene Block in the Main Chain)

A maleic acid modified polyolefin with a polypropylene block in a main chain is obtained by modifying an end or a side chain of the polyolefin with a polypropylene block in a main chain with maleic acid.

A main chain is preferably a block copolymer containing one or more of polypropylene blocks, polyethylene blocks, and polybutene blocks.

A content of the maleic acid modified polyolefin with a polypropylene block in a main chain in the toner is preferably within a range from 2.1 wt. % to 30.0 wt. %, more preferably within a range from 3.0 wt. % to 20.0 wt. %, and further preferably within a range from 5.0 wt. % to 10.0 wt. %. If the content is 2.1 wt. % or more, sufficient fixability can be obtained for a plastic film of the toner, particularly a plastic film having a smooth and water-repellent surface. In addition, if the content is 30.0 wt. % or less, the maleic acid modified polyolefin with a polypropylene block in a main chain can be finely dispersed in the toner at the time of fixing, and an amount exposed to the surface can be reduced, thereby maintaining the heat resistant preservability. The content can be calculated from the calorific value of the exothermic peak appearing in the range from 40° C. to 70° C. in the cooling process of the polyolefin by the DSC after the first heating process by the DSC of the toner. For the toner having the content that is within the range from 2.1 wt. % to 30.0 wt. %, an exothermic peak is detected in the range from 40° C. to 70° C. in the cooling process of the polyolefin by the DSC measurement after the first heating process of the polyolefin by the DSC.

The melting point of the maleic acid modified polyolefin with a polypropylene block in a main chain is preferably within a range from 60° C. to 100° C., more preferably within a range from 63° C. to 95° C., and further preferably within a range from 65° C. to 90° C. When the melting point is 60° C. or higher, it is possible to make it difficult for images formed of the toner according to the embodiment to adhere to each other by heat. If the melting point is 100° C. or lower, the toner can be fixed at a low temperature since sufficient low temperature fixability of the toner is obtained on a plastic film. Therefore, it is possible to suppress an occurrence of curl of a plastic film during the fixing process.

A weight average molecular weight of the maleic acid modified polyolefin with a polypropylene block in a main chain is preferably within a range from 60000 to 100000, more preferably within a range from 65000 to 90000, and further preferably within a range from 70000 to 80000. Fixation to plastic films is achieved when the weight average molecular weight is 60000 or more. When the weight average molecular weight is 100000 or less, sufficient fixability on the plastic film is obtained because the melting point is low and the melt viscosity is low.

A maleic acid modification rate of the maleic acid modified polyolefin with a polypropylene block in a main chain is preferably within a range from 0.5 wt. % to 8.0 wt. %, more preferably within a range from 1.0 wt. % to 7.0 wt. %, and further preferably within a range from 3.0 wt. % to 6.0 wt. %. If the maleic acid modification rate is within the above-described preferred range, the maleic acid modified polyolefin with a polypropylene block in a main chain can penetrate an interface between the plastic film and the toner when the toner melts. Thus, excellent fixability to the plastic film can be provided.

Suitable maleic acid modified polyolefins with polypropylene block in a main chain may include, for example, TOYOTAC-L, TOYOTAC-KE, TOYOTAC-KH, or TOYOTAC-T of Toyobo Co., Ltd.

(Method of Separating Maleic Acid Modified Polyolefin with Polypropylene Block in a Main Chain from Toner)

Isolation, qualitative analysis, and quantitative analysis of maleic acid modified polyolefins with a polypropylene block in a main chain included in the toner according to the embodiment can be performed in a variety of ways. For example, the toner can be analyzed by a variety of methods such as spectral analysis, elemental analysis, DSC measurement, or other chemical analysis, as described below. If the toner is difficult to analyze by itself, the toner may be extracted by Soxhlet extraction with a solvent that dissolves a bonding resin such as tetrahydrofuran (THF), or toluene, a filtrate thereof is concentrated by an evaporator, and then the maleic acid modified polyolefin with a polypropylene block in a main chain may be separated. Thus, the predetermined analysis can be performed. In addition, a variety of analytical methods can be used, such as analyzing samples separated by GPC, or analyzing samples separately extracted with a single or mixed solvent. The above-described analytical methods may be used singly, or a combination of two or more analytical methods may be used.

(Component Analysis by GC-MS)

Confirmation of the presence and quantification of the maleic acid modified polyolefins with polypropylene block in a main chain in the toner according to the embodiment may be performed according to the following procedure, apparatus and conditions.

((Sample Processing))

The toner is dispersed in chloroform and stirred overnight. The dispersion is then centrifuged, and only supernatant liquid is collected. The collected supernatant liquid is evaporated and dried. The obtained material components are analyzed using a gas chromatograph mass spectrometer (GC-MS). An example of the GC-MS measurement conditions is shown below. Then, about 1 μL of a methylating agent (tetramethylammonium hydroxide 20% methanol solution: TMAH) is dropped into about 1 mg of the above-described sample. A mixture thereof will be used as a sample in the following.

((Measurement Conditions))

Measurement conditions are as follows.

Pyrolysis-Gas Chromatograph Mass Spectrometry (Py-GCMS) Analyzer (QP2010, Shimadzu Corporation) is used. For the heating furnace, Frontier Lab Py2020D is used. Heating temperature is 320° C. For a column, Ultra ALLOY-5 is used with L=30 m, I. D=0.25 mm, and Film=0.25 μm. The column temperature is increased from 50° C. (retention time is 1 minute) at a rate of 10° C./minute to 340° C. (retention time is 7 minutes). A split ratio is 1:100. A Column flow rate is 1.0 ml/min. For the ionization method, EI method is used at 70 eV. Measurement mode is a scan mode.

For search data, NIST 20 MASS SPECTRAL LIB is used.

(Component Analysis by NMR)

The confirmation of the presence and the quantification of the maleic acid modified polyolefin with a polypropylene block in a main chain of the toner can be performed according to the following procedure, apparatus, and conditions.

((Preparation of Sample))

The toner is dispersed in chloroform and stirred overnight. The dispersion is then centrifuged and only supernatant liquid is collected. The collected supernatant liquid is evaporated and dried to make samples for $^{1}$H-NMR and $^{13}$C-NMR, and components of the sample are analyzed by the GC-MS. Examples of a sample preparation method for $^{1}$H-NMR, a sample preparation method for $^{13}$C-NMR, and measurement conditions are as follows.

(1) Preparation of Samples for $^{1}$H-NMR

To 100 mg of sample, 1 mL of toluene-$d_8$ is added, the sample is heated in a dryer and dissolved, and $^{1}$H-NMR is measured.

(2) Preparation of Samples for $^{13}$C-NMR

To 100 mg of the sample, 1 mL of deuterated 1,2-dichlorotoluene is added, the sample is heated and dissolved in a dryer, and $^{13}$C-NMR is measured.

((Measurement Conditions))

Measurement conditions are as follows.

NMR equipment (ECX-500, Japan Electronics) is used. In the case of performing measurement for Nucleus $^{1}$H at the frequency of 500 MHz: Measurement pulse file is "single pulse dec.jxp" for $^{1}$H. Temperature of the pulse is 45° C. 20000 pulses are applied with the relaxation delay of 4 seconds. Obtained data point number is 32K. Offset is 100 ppm. The observation width is 250 ppm. The measurement temperature is 70° C.

In the case of performing measurement for nucleus $^{1}$C at the frequency of 125 MHz: Measurement pulse file is "single pulse dec.jxp" for $^{13}$C. Temperature of the pulse is 45° C. 64 pulses are applied with the relaxation delay of 5 seconds. Obtained data point number is 32K. The observation width is 15 ppm. The measurement temperature is 65° C.

(Measurement Method of Weight Average Molecular Weight)

The weight average molecular weight of the toner according to the embodiment is obtained by measuring the molecular weight distribution of the THF dissolved part by a gel permeation chromatography (GPC) measuring device. For example, GPC-150C (manufactured by Waters) may be used as the GPC measuring device.

The measurements can be made using columns (KF801 to KF807, Showdex) in the following manner.

For example, the columns are stabilized in a heat chamber at 40° C., and THF as a solvent is passed through the columns at this temperature at a flow rate of 1 ml per minute.

Then, 0.05 g of the sample is dissolved well in 5 g of THF. The solution is filtered through a pretreatment filter (e.g. chromatographic disk (pore size of 0.45 μm, Kurabo)). Finally, the sample concentration is controlled to be within a range from 0.05 wt. % to 0.6 wt. %. 50-200 μl of the THF sample solution, in which the sample concentration is controlled is injected into the columns. The THF dissolved part contained in the THF sample solution is separated. The THF dissolved part is converted to a molecular weight using a detector. Thus, the weight average molecular weight Mw of the THF dissolved part contained in the THF sample solution can be measured.

Measurement of the weight average molecular weight of the dissolved part of THF contained in the sample is performed by calculating from a relationship between logarithmic values of calibration curves prepared regarding the molecular weight distribution of the sample by using several monodispersed polystyrene standard samples and the number of counts.

For the polystyrene standard samples for preparing calibration curves, polystyrenes manufactured by Pressure Chemical or Toyo Soda Industries having molecular weights of $6\times10^2$, $2.1\times10^2$, $4\times10^2$, $1.75\times10^4$, $5.1\times10^4$, $3.9\times10^5$, $8.6\times10^5$, $2\times10^6$, and $4.48\times10^6$ can be used. It is appropriate to use at least 10 standard polystyrene samples.

A differential refractive index (RI) detector may be used for the detector.

(Measurement Method of Thermal Characteristics such as Melting Point by DSC)

An automatic differential scanning calorimeter (for example, DSC-60A Plus, Shimadzu Corporation) can be used to measure thermal characteristics such as melting point by the DSC. For example, 5 mg of sample is weighed and set in an aluminum pan, the sample is cooled to −20° C., and the measurement is performed for the sample while raising and lowering the temperature under the following temperature conditions. Melting point refers to the endothermic peak temperature in the second heating process of the polyolefin by the DSC.

((Temperature Conditions))

In the first heating process of the polyolefin by the DSC, sample is heated from −20° C. to 150° C. at a rate of 10° C./min;

In the second cooling process of the polyolefin by the DSC, the sample is cooled from 150° C. to −20° C. at a rate of −10° C./min; and In the second heating process of the polyolefin by the DSC, the sample is heated from −20° C. to 150° C. at a rate of 10° C./min.

(Polyester Resin)

The bonding resin preferably contains a polyester resin in addition to the polyolefin. Preferably, the polyester resin is included as a main component. In general, the polyester resin can be suitably used as the toner bonding resin according to the embodiment because low temperature fixing can be performed well while maintaining the heat resistant preservability compared with the other bonding resins.

Polyester resins are obtained by condensation polymerization of alcohols with carboxylic acids.

The alcohol is not particularly limited, and may be selected according to the purpose. Suitable alcohols may include, for example, glycols such as ethylene glycol, diene glycol, triethylene glycol, propylene glycol, etherified bisphenols such as 1,4-bis(hydroxymeta)cyclohexane and bisphenol A, other divalent alcohol monomers, and trivalent or more alcohol monomers.

The carboxylic acid is not particularly limited and may be selected according to the purpose. Suitable carboxylic acids may include, for example, monomers of divalent organic acids such as maleic acid, fumaric acid, phthalic acid, isophthalic acid, terephthalic acid, succinic acid, or malonic acid, monomers of trivalent or more carboxylic acids such as 1,2,4-benzenetricarboxylic acid, 1,2,5-benzenetricarboxylic acid, 1,2,4-cyclohexanetricarboxylic acid, 1,2,4-naphthalenetricarboxylic acid, 1,2,5-hexanetricarboxylic acid, 1,3-dicarboxyl-2-methylenecarboxypropane, or 1,2,7,8-octanotetracarboxylic acid.

The glass transition point (also referred to as glass transition temperature) Tg of the polyester resin is not particularly limited, and can be appropriately selected depending on the purpose. The glass transition point is preferably within a range from 50° C. to 75° C. The glass transition point Tg of the polyester resin can be measured by the DSC.

(Other Bonding Resins)

The toner according to the embodiment can contain other bonding resin components other than the polyester resin and the polyolefin described above. Suitable bonding resins may include, for example, styrene-based resins (single polymer or copolymer including styrene or styrene substituents) such as styrene, poly-α-styrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylate copolymer, styrene-methacrylate copolymer, styrene-α-methyl chloroacrylate copolymer, and styrene-acrylonitrile-acrylate copolymer, and known bonding resins such as epoxy resin, vinyl chloride resin, rosin modified maleic acid resin, phenolic resin polyethylene resin, polypropylene resin, petroleum resin, polyurethane resin, ketone resin, ethylene-ethyl acrylate copolymer, xylene resin, and polyvinyl butyrate resin.

The method of manufacturing the bonding resin is not particularly limited, and known manufacturing methods such as bulk polymerization, solution polymerization, emulsion polymerization, and suspension polymerization may be used.

[Other Components]

The toner according to the embodiment may contain other components. Other components may include, for example, release agents, colorants, charge control agents, external additives, fluidity improvers, cleanability improvers, and magnetic materials.

(Release Agent)

The release agent is not particularly limited and may be selected according to the purpose. Suitable release agents may include aliphatic hydrocarbons such as liquid paraffin, microcrystalline wax, natural paraffin, synthetic paraffin, polyolefin wax, and partial oxides, fluorides, and chlorides thereof; animal oils such as beef fat, and fish oil; vegetable oils such as coconut oil, soybean oil, rapeseed oil, rice bran wax, and carnauba wax; higher aliphatic alcohols such as montan wax, higher aliphatic acids, aliphatic acid amide, aliphatic acid bisamide; metallic soap such as zinc stearate, calcium stearate, magnesium stearate, aluminum stearate, zinc oleate, zinc palmitate, magnesium palmitate, zinc myristate, zinc laurate, zinc behenate, and the like; aliphatic acid esters, polyvinylidene fluoride or the like. The above-described release agents may be used singly, or a combination of two or more release agents may be used.

The release agent preferably contains at least an ester wax, such as an aliphatic acid ester, among the above-described components. When the toner contains maleic acid modified polyolefin with a polypropylene block in a main chain, if the amount of the polyolefin is large, the toner and the fixing roller (or the fixing belt) may not be separated during the fixing process, and a paper jam of wasted paper may occur. When ester wax is added to the release agent, the above-described defect can be suppressed. Furthermore, maleic acid modified polyolefins with a polypropylene block in a main chain can finely disperse ester waxes.

A content of the ester wax in the toner is preferably within a range from 0.1 wt. % to 8.0 wt. %. When the content is 0.1 wt. % or more, the toner and the fixing roller (or the fixing belt) can be separated during the fixing process, and the occurrence of a paper jam of wasted paper can be suppressed. In addition, if the content is 8.0 wt. % or less, sufficient fixability of the toner on a plastic film can be obtained.

(Colorants)

The colorant is not particularly limited, and the commonly used colorant may be appropriately selected and used.

The black toner is preferably carbon black alone or a toner in which carbon black is contained as a main component and hue and brightness are controlled by mixing copper phthalocyanine or the like.

The cyan toner is preferably copper phthalocyanine that is pigment blue 15:3 or copper phthalocyanine mixed with aluminum phthalocyanine.

For the magenta toner, pigment red 53:1, pigment red 81, pigment red 122, pigment red 269, or the like may be used. The above-described pigment reds may be used singly, or a combination of two or more pigment reds may be used.

For the yellow toner, pigment yellow 74, pigment yellow 155, pigment yellow 180, pigment yellow 185, or the like may be used. The above-described pigment yellows may be used singly, or a combination of two or more pigment yellows may be used. Among them, pigment yellow 185 or a mixture of pigment yellow 74 and pigment yellow 185 is preferable in terms of saturation and preservability.

For a white pigment, titanium dioxide may be used and the surface of the toner is preferably treated with silicon, zirconia, aluminum, polyol, or the like.

For a green toner, pigment green 7 or the like may be used, but it is necessary to pay attention to safety.

For a blue toner, pigment blue 15:1, pigment violet 23, or the like may be used.

The toner according to the embodiment is preferably white or transparent (containing no colorant) in order not to impair the color tint of the toner overlapping the white or transparent toner. When the toner according to the embodiment is used as an underlying layer (the layer on which an image is formed, on the side nearest to the recording medium) and a color toner layer is formed on the upper layer, impairing of the color tint of the color toner can be reduced.

(Charge Control Agent)

The charge control agent is not particularly limited, and can be selected according to the purpose. Suitable charge control agents may include, for example, modified materials by nigrosine, aliphatic acid metal salts and the like, onium salts such as phosphonium salt and lake pigments thereof, triphenylmethane dyes and lake pigments thereof; diorganotin oxides, such as dibutyltin oxides, dioctyltin oxides, and dicyclohexyltin oxides; diorganotinborates, such as dibutyltin borates, dioctyltin borates, and dicyclohexyltin borates; organometallic complexes, chelate compounds, monoazo metal complexes, acetylacetone metal complexes, aromatic hydroxycarboxylic acid-based metal complexes, aromatic dicarboxylic acid-based metal complexes, and quaternary ammonium salts. Other charge control materials may include aromatic hydroxycarboxylic acids, aromatic monocarboxylic acids, and aromatic polycarboxylic acids and their metal salts, anhydrides, esters, phenolic derivatives such as bisphenol, and the like. The above-described charge control agents may be used singly, or a combination of two or more charge control agents may be used.

Amount of addition of the charge control agent to the toner according to the embodiment is preferably 0.1 to 10 pts. mass of the bonding resin. In addition, since the toner may be colored by the charge control agent, a charge control agent that is as transparent as possible, except for the black toner, is preferably chosen.

(External Additives)

Inorganic fine particles or the like may be used as an external additive.

Suitable inorganic fine particles may include, for example, silica, alumina, titanium oxide, barium titanate, magnesium titanate, calcium titanate, strontium titanate, zinc oxide, silica sand, clay, mica, wollastonite, silica limestone, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. Among them, silica, alumina, and titanium oxide are preferably used.

In addition, the inorganic particles may be surface treated with a hydrophobizing agent. Suitable hydrophobization treatment agents may include, for example, silane coupling agents, silylating agents, silane coupling agents having fluorinated alkyl groups, organic titanate-based coupling agents, and aluminum-based coupling agents. In addition, silicone oil can be used as a hydrophobization treatment agent to obtain sufficient effect.

In addition, an average particle diameter of a primary particle of the inorganic fine particles is preferably within a range from 5 nm to 500 nm, and more preferably 10 nm to 200 nm. If the average particle diameter is 5 nm or more, aggregation of the inorganic particles is suppressed, and the inorganic particles can be uniformly dispersed in the toner. If the average particle diameter is 500 nm or less, the heat-resistant preservability can be improved according to the filler effect.

The value of the average particle diameter is obtained directly from a photograph captured by a transmission electron microscope, and at least 100 particles are preferably observed to calculate an average value of their long diameters.

(Fluidity Improver)

The fluidity improver can be appropriately selected according to the purpose, without any particular limitation, as long as the surface treatment improves the hydrophobicity and suppresses deterioration of the fluidity or the charge characteristic even under high humidity. Suitable fluidity improvers may include, for example, silane coupling agent, silanizing agent, silane coupling agent having a fluorinated alkyl group, organotitanate-based coupling agent, aluminum-based coupling agent, silicone oil, and modified silicone oil. The silica and the titanium oxide are particularly preferably subjected to the surface treatment with the above-described fluidity improver, and used as hydrophobic silica and hydrophobic titanium oxide, respectively.

(Cleanability Improvers)

The cleanability improver can be appropriately selected according to the purpose, without any particular limitation, as long as the cleanability improver is added to the toner according to the embodiment to remove a developer remaining in the photosensitive element or the primary transfer medium after the transfer process. Suitable cleanability improvers may include, for example, aliphatic acid metal salts such as zinc stearate, calcium stearate and stearic acid, and polymer fine particles manufactured by soap-free emulsion polymerization such as polymethylmethacrylate fine particles and polystyrene fine particles. The polymer fine particles preferably have relatively narrow particle size distributions and have volume average particle diameters that are within a range from 0.01 μm to 1 μm.

(Magnetic Material)

The magnetic material is not particularly limited and may be appropriately selected depending on the purpose. Suitable magnetic materials may include, for example, iron powder, magnetite, or ferrite. Among them, a white material is preferably used from the viewpoint of the color tone.

<Method of Manufacturing Toner>

A method of manufacturing the toner according to the embodiment will be described. The method of manufacturing the toner according to the embodiment includes mixing a bonding resin (mixing step); kneading the mixture (melt and kneading step); solidifying the kneaded material (solidification step); pulverizing the solid material (pulverizing step); and classifying and collecting the pulverized material (classification step).

First, a bonding resin, a colorant, a release agent, and a charge control agent, if necessary, or the like are mixed by a mixer such as a Henschell mixer or a super-mixer, to obtain a mixture (mixing step).

The mixture is then melted and kneaded using a thermal melt kneader such as a heat roll, a kneader, an extruder, or the like, to obtain a kneaded material (melt and kneading step).

The kneaded material is then cooled and solidified to obtain a solid (solidification step). A method of cooling and a method of solidifying are not particularly limited, and any suitable methods may be used.

The solid is then pulverized to obtain the pulverized product (pulverization step). Solids can be pulverized using known pulverizing methods. Suitable pulverization methods may include, for example, a jet mill method in which a toner is included in a high-speed airflow and solids are pulverized according to the energy of the toner when collided with a collision plate, an inter-particle collision method in which toners collide with each other in the airflow, and a mechanical pulverizing method in which a toner is pulverized by being supplied between a fast rotating rotor and a narrow gap.

The pulverized products are then classified so that pulverized products with a predetermined volume average particle diameter are collected. According to the above-described processes, the toner can be obtained (classification step). The classification method is not particularly limited, and any suitable method can be used.

The toner according to the embodiment can be manufactured using a dissolution suspension method. When the toner is manufactured using the dissolution suspension method, an oil phase in which toner materials, such as a bonding resin, a colorant, a release agent, and, if necessary, a charge control agent, are dissolved or dispersed in an organic solvent is dispersed in an aqueous medium (aqueous phase) so that a reaction is performed for the bonding resin. Thus, a dispersion liquid containing the dispersion (oil droplet) containing the prepolymer, in which the toner material is emulsified or dispersed is obtained. Subsequently, the organic solvent is removed from the dispersion liquid, filtered, washed, dried, and classified, as necessary. Thus, parent toner particles are manufactured. The toner according to the embodiment can be obtained by granulating the parent particles obtained by using the dissolution suspension method.

The organic solvent is not particularly limited, and the organic solvent may be appropriately selected depending on the purpose. The organic solvent preferably has a boiling point of less than 150° C., since such an organic solvent is easily removed.

The organic solvent with a boiling point of less than 150° C. is not particularly limited, and may be appropriately selected according to the purpose. Suitable organic solvents may include, for example, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. The above-described solvents may be used singly, or a combination of two or more solvents may be used.

Among the above-described organic solvents, ethyl acetate, toluene, xylene, benzene, methylene chloride, 1,2-dichloroethane, chloroform, carbon tetrachloride, and the like are preferably used, and ethyl acetate is more preferably used.

The aqueous medium is not particularly limited and may be selected depending on the purpose. Suitable aqueous media may include, for example, water, solvents miscible with water, and mixtures thereof. The above-described aqueous media may be used singly, or a combination of two or more media may be used. Among the above-described media, water is preferably used.

The solvent miscible with water is not particularly limited, and can be selected according to the purpose. Suitable solvents miscible with water may include, for example, alcohols, lower ketones, dimethylformamide, tetrahydrofuran, and cellosolves. The alcohol is not particularly limited and may be selected according to the purpose. Suitable alcohols may include, for example, methanol, isopropanol, and ethylene glycol. The lower ketones may be selected according to the purpose. Suitable lower ketones may include, for example, acetone, and methyl ethyl ketone.

The method of removing the organic solvent from the dispersion liquid is not particularly limited, and can be selected according to the purpose. Suitable methods of removing the organic solvent from the dispersion liquid may include, for example, a method in which an entire reaction system is gradually heated to vaporize the organic solvent in the oil droplet, and a method in which the dispersion liquid is sprayed in a dry atmosphere so as to remove the organic solvent in the oil droplet.

The classification process may be performed by removing the fine particle portions by a cyclone, a decanter, a centrifugation, or the like in a liquid, or by classifying the pulverized products after drying the dispersion liquid.

As described above, the toner according to the embodiment contains polyolefin, the toner has an exothermic peak in the range from 40° C. to 70° C. in the cooling process of the polyolefin by the DSC after the first heating process of the polyolefin by the DSC, the polyolefin does not have an exothermic peak in the cooling process of the polyolefin by the DSC after the first heating process of the polyolefin by the DSC, and an exothermic peak in the range from 0° C. to 30° C. at the second heating process of the polyolefin by the DSC. The toner according to the embodiment has a low melting point and can be made difficult to crystallize. Therefore, when the toner is bonded to a plastic film, the adhesion force to the plastic film is increased and fixability to the plastic film is enhanced. Accordingly, the toner according to the embodiment has excellent fixability and image fastness to the plastic film.

Because the toner according to the embodiment has a low melting point, when the toner is fixed to the plastic film, excessive heating of the plastic film can be avoided. Thus, an occurrence of a curl of the plastic film can be suppressed.

Furthermore, the toner according to the embodiment has a low melting point and can be made difficult to crystallize, so that the toner exhibits excellent heat resistant storage stability. The heat resistant storage stability can be evaluated by measuring an amount of aggregates occurring in the toner after the toner is stored in a long term (e.g. 14 days) under an environment of high temperature and high humidity (e.g. 40° C. and 70 RH %).

Because a fixed state of toner to the plastic film can be maintained by using the toner according to the embodiment, the layer made of the toner according to the embodiment can be used as an underlayer directly contacting the plastic film. When an image layer formed of a color toner is provided on the underlayer, the image layer can be well fixed to the plastic film through the underlayer. In addition, since the underlayer formed by using the toner according to the embodiment can have a moderate flexibility, the underlayer can be easily deformed so as to follow a shape of a medium that is easily deformed, such as a plastic film. Further, since the underlying layer formed by using the toner according to the embodiment is easily followed by the movement of the plastic film, an occurrence of a peeling of the underlying layer from the plastic film can be suppressed. Thus, the image layer disposed on the surface of the underlying layer is not affected by color of the surface of the plastic film, and it is possible to prevent color reproducibility and color developing property of the image layer from being impaired. Therefore, with the toner according to the embodiment, an image with excellent color development can be formed on the surface of the plastic film, and the image formed on the surface of the plastic film can be stably maintained.

In the toner according to the embodiment, maleic acid modified polyolefin having at least a polypropylene block in a main chain can be used as polyolefin. Since the maleic acid modified polyolefin with a polypropylene block in a main chain can enhance fixability and image fastness to the plastic film, the toner according to the embodiment can exhibit fixability and image fastness to the plastic film more reliably.

In the toner according to the embodiment, the melting point of the maleic acid modified polyolefin can be made within a range from 60° C. to 100° C. Since the low-temperature fixability of the toner to the plastic film can be increased, and the toner can be easily fixed to the plastic film at lower temperature, an occurrence of a curl of the plastic film during the fixing process can be further suppressed.

In the toner according to the embodiment, the weight average molecular weight of the maleic acid modified polyolefin can be within a range from 60000 to 100000. Thus, since the melting point and the melting viscosity of the toner can be lowered, the low temperature fixability can be increased and the adhesion between the toner and the plastic film can be increased. Accordingly, the toner according to the embodiment can be easily fixed at a lower temperature to the plastic film, and an occurrence of a curl of the plastic film during the fixing process can be further suppressed.

In addition, when the layer made of the toner according to the embodiment is used as the underlayer that directly contacts with the plastic film and an image layer made of a color toner is provided on the underlayer, the adhesion between the image layer and the underlayer can be enhanced. Thus, the toner according to the embodiment can make it easy to form an image having excellent fixability to the plastic film via the underlayer.

Because the toner according to the embodiment can be transparent or white, a layer made of the toner according to the embodiment can be made transparent or white. Thus, when the layer made of the toner according to the embodiment is used as the underlayer that directly contacts with the plastic film and an image layer formed of the color toner is disposed on the underlayer, impairing of the color reproducibility or color development of the image layer can be suppressed. Thus, if the layer made of the toner according to the embodiment is used as the underlayer on the plastic film, the color reproducibility and color development of the image layer can be enhanced.

<Developer>

The developer according to the embodiment may include the toner according to the embodiment and further include other components appropriately selected, such as carriers, as necessary. Thus, an underlayer with excellent fixability can be formed on the surface of the plastic film.

The developer may be a single-component developer or a two-component developer. However, in the case where a high-speed printer or the like corresponding to an improvement in the information processing speed in recent years is used, a two-component developer is preferably used from the viewpoint of improving the life of the printer.

In the case of using the toner according to the embodiment as the one-component developer, a good and stable developing property and images are obtained even for long-term agitation in the developing device. Even when inputs/outputs of toner are performed, a variation of the particle size of the toner is small, and the toner filming on the developing roller or fusing of the toner to a member such as a blade for thinning the toner are small.

When the developer according to the embodiment is used as the two-component developer, the developer according to the embodiment can be mixed with a carrier and used as a developer. In the case of using the toner according to the embodiment as the two-component developer, even when the inputs/outputs of toner are performed for a long period, the variation of the particle size of the toner is small, and a good and stable developing property and image are obtained even for long-term agitation in the developing device.

The content of the carrier in the two-component developer can be appropriately selected according to the purpose, but is preferably within a range from 90 parts by mass to 98 parts by mass compared to 100 parts by mass of the two-component developer, and is more preferably within a range from 93 parts by mass to 97 parts by mass.

The developer according to the embodiment can be suitably used for an image forming by using various known electrophotographic methods, such as a magnetic one-component development method, a non-magnetic one-component development method, or a two-component development method.

[Carriers]

The magnetic particles may be used as the carrier. As the magnetic particles, particles of spinel ferrite such as magnetite or gamma iron oxide, spinel ferrite containing one or more metals other than iron (Mn, Ni, Zn, Mg, Cu, or the like), magneto-plant bite ferrite such as barium ferrite, or iron or alloy having an oxide layer on the surface may be used. In view of the chemical stability, spinel ferrite such as magnetite or gamma iron oxide, or magneto-plant bite ferrite such as barium ferrite, is preferably used. Specifically, suitable examples include MFL-35S, MFL-35HS (manufactured by Powdertech), DFC-400M, DFC-410M, and SM-350NV (manufactured by Dowa Iron Powder Co., Ltd.).

Particularly, in the case where high magnetization of the carrier is required, ferromagnetic fine particles such as iron are preferably used as the carrier.

A shape of the carrier may be any of granular, spherical, or needle-like.

A resin carrier having desired magnetization can be used if an appropriate type of the carrier and an appropriate content of the carrier are selected. The magnetic characteristic of the resin carrier at this time is preferably that the magnetization strength is within a range from 30 emu/g to 150 emu/g at 1000 oersted.

As the above-described resin carrier, a resin carrier in which the carrier is dispersed in a condensation type binder, can be manufactured by spraying a melt-kneaded material of the carrier and an insulating binder resin by using a spray dryer, or by reacting a monomer or prepolymer in an aqueous medium in the presence of the carrier to cure the monomer of the prepolymer.

The chargeability can be controlled by causing positively or negatively charged fine particles or conductive fine particles to adhere to the surface of the carrier or by coating the surface of the carrier with a resin.

The surface coat material (resin) may be a silicone resin, an acrylic resin, an epoxy resin, a fluorine-based resin, or the like. Furthermore, the coating may include positively or negatively charged fine particles or conductive fine particles. Among them, silicone resin and acrylic resin are preferably used.

The weight ratio of the carrier in the developer stored in the developing device is preferably greater than or equal to 85 wt. % and less than 98 wt. %. If the weight ratio is greater than or equal to 85 wt. % and less than 98 wt. %, dispersion of the toner from the developing device can be easily suppressed, and generation of a defective image can be suppressed. In addition, since it is possible to suppress an excessive increase in the charging amount of the toner for electrophotographic development or a shortage of the supply amount of the toner for electrophotographic development, an occurrence of a defective image due to a decrease in an image density can be suppressed.

<Developer Storage Container>

A developer storage container according to the embodiment stores the developer according to the embodiment. The developer storage container is not particularly limited, and can be appropriately selected from publicly known containers, but includes a container having a container body and a cap.

In addition, a size, a shape, a structure, and a material of the container body are not particularly limited. The container body preferably has a cylindrical shape, and has irregularities formed in a spiral shape on the inner peripheral surface. By rotating the container body, the developer, stored in the container, is easily transferred to the discharge port side. Further, a part or all of the irregularities are preferably formed in a bellows-like shape. According to the shape the developer is more easily transferred to the discharge port side. Further, the material of the container is not particularly limited, but a material with high dimensional accuracy is preferably used. Suitable resin materials may include, for example, a resin material such as polyester resin, polyethylene resin, polypropylene resin, polystyrene resin, polyvinyl chloride resin, polyacrylic acid, polycarbonate resin, ABS resin, or polyacetal resin.

Since the developer storage container is easy to store, transport, and the like, and is excellent in handling property, the developer storage container can be detachably mounted on an image forming apparatus, a process cartridge, or the like, which will be described later, and used for replenishing developer.

<Toner Set>

The toner set according to the embodiment may include a color toner containing a bonding resin and a colorant, and the toner according to the embodiment.

The color toner is not particularly limited, and can be selected appropriately from known color toners depending on the purpose. The bonding resin is not particularly limited, and can be appropriately selected depending on the purpose. For example, the bonding resin of the color toner may be the same as that included in the toner according to the embodiment. The colorant is not particularly limited, and can be appropriately selected from known colorants according to the purpose.

Because an image is formed using the toner according to the embodiment by mounting the toner set according to the embodiment to the image forming apparatus to form an image, an image is formed utilizing the characteristics of the toner having excellent fixability to a plastic film.

<Toner Storage Unit>

The toner storage unit according to the embodiment stores the toner according to the embodiment. The toner storage unit according to the embodiment refers to a unit that has a function of storing toner that stores the toner. Here, suitable toner storage units according to the embodiment may include, for example, a toner storage container, a developing device, and process cartridges.

The toner storage container means a container storing toner.

The developing device is a device provided with a means for storing toner and a means for performing the developing process.

The process cartridge is a combination of at least an electrostatic latent image carrier (also referred to as an image carrier) and a developing unit to store the toner and detachable from the image forming apparatus. The process cartridge may further be provided with at least one selected from a charging means, an exposure means, and a cleaning means.

The toner storage unit according to the embodiment stores the toner according to the embodiment. Since an image is formed using the toner according to the embodiment by mounting the toner storage unit according to the embodiment to the image forming apparatus to form an image, an image is formed by utilizing the characteristics of the toner having excellent fixability to a plastic film.

<Image Forming Apparatus>

The image forming apparatus according to the embodiment includes an electrostatic latent image carrier, an electrostatic latent image forming unit that forms an electrostatic latent image on the electrostatic latent image carrier, and a developing unit that develops the electrostatic latent image formed on the electrostatic latent image carrier using toner to form a toner image. The image forming apparatus may have other configurations as required.

The image forming apparatus according to the embodiment more preferably includes, in addition to the above-described electrostatic latent image carrier, the electrostatic latent image forming unit, and the developing unit, a transfer unit that transfers the toner image to a recording medium and a fixing unit that fixes the transfer image transferred to a surface of the recording medium.

The toner according to the embodiment is used in the developing unit. Preferably, the toner image may be formed by using a developer containing the toner according to the embodiment and optionally containing other components such as a carrier.

(Electrostatic Latent Image Carrier)

A material, a shape, a structure, a size, and the like of the electrostatic latent image carrier (also referred to as "electrophotographic photosensitive element" or "photosensitive element") are not particularly limited, and can be appropriately selected from publicly known ones. Suitable materials of the electrostatic latent image carrier may include, for example, inorganic photoconductors such as amorphous silicon and selenium, and organic photoconductors (OPC) such as polysilane and phthalopolymethine. Among them, amorphous silicon is preferable according to its long life.

As the amorphous silicon photosensitive element, for example, a photoconductive element having a photoconductive layer made of a-Si obtained by heating a support to a temperature within a range from 50° C. to 400° C. and forming on the support by a film deposition method such as a vacuum deposition method, a sputtering method, an ion plating method, a thermal chemical vapor deposition (CVD) method, an optical CVD method, or a plasma CVD method, may be used. Among them, plasma CVD methods, in which raw gas is decomposed by direct current or by radio frequency or microwave glow discharge to form an a-Si deposition film on the support, are preferably used.

The shape of the electrostatic latent image carrier is not particularly limited, and can be appropriately selected depending on the purpose. However, a cylindrical shape is preferable. The outer diameter of the cylindrical electrostatic latent image carrier is not particularly limited and may be selected depending on the purpose, but is preferably within a range from 3 mm to 100 mm, more preferably within a range from 5 mm to 50 mm, and particularly preferably within a range from 10 mm to 30 mm.

(Electrostatic Latent Image Forming Unit)

The electrostatic latent image forming unit is not particularly limited as long as an electrostatic latent image is formed on the electrostatic latent image carrier, and can be appropriately selected depending on the purpose. The electrostatic latent image forming unit includes, for example, a charging device (charger) for uniformly charging the surface of the electrostatic latent image carrier and an exposure device (exposurer) for imagewise exposing the surface of the electrostatic latent image carrier.

The charger is not particularly limited and may be selected depending on the purpose. Suitable chargers may include, for example, contact chargers provided with conductive or semi-conductive rolls, brushes, films, rubber blades and the like, and non-contact chargers utilizing corona discharges such as corotron, and scorotron.

The shape of the charger may be any form, such as a magnetic brush or a fur brush, in addition to the roller, and can be selected according to the specifications or the configuration of the image forming apparatus.

The charger is preferably a device that is disposed on the electrostatic latent image carrier in a non-contact state or in contact state and charges the surface of the electrostatic latent image carrier by applying a superimposed DC and AC voltage. In addition, the charger is preferably a charging roller disposed in a non-contact state close to the electrostatic latent image carrier through a gap tape and charging the surface of the electrostatic latent image carrier by applying a superimposed DC and AC voltage to the charging roller.

The charger is not limited to a contact-type charger. However, a contact-type charger is preferably used because an image forming apparatus with the contact-type charging device generates ozone less than that from the other type of charging devices.

The exposurer is not particularly limited, as long as the exposure can be performed in the form of an image to be formed on the surface of the electrostatic latent image carrier charged by the charger, and the exposurer can be appropriately selected depending on the purpose. Suitable exposurers may include, for example, a copying optical system, a rod lens array system, a laser optical system, and a liquid crystal shutter optical system.

A light source used in the exposurer is not particularly limited and may be selected according to the purpose. Suitable light sources may include, for example, light emitting materials in general such as fluorescent lamps, tungsten lamps, halogen lamps, mercury lamps, sodium lamps, light emitting diodes (LEDs), semiconductor lasers (LDs), and electroluminescence (EL).

Moreover, various filters, such as sharp-cut filters, band-pass filters, near-infrared cut filters, dichroic filters, interference filters, and color temperature conversion filters, can be used to irradiate only with light within the desired wavelength range.

In addition, an optical backside system, in which light is emitted from the backside of the electrostatic latent image carrier in an image-like manner, may be employed.

(Developing Unit)

The developing unit is not particularly limited as long as the electrostatic latent image formed on the electrostatic latent image carrier can be developed to form a toner image, and may be appropriately selected according to the purpose. For example, the developing unit provided with a developing device that stores toner and provides toner contactly or non-contactly to an electrostatic latent image is preferably used. The developing device provided with a toner container is preferably used.

The developing device may be a monochromatic developing device or a multicolor developing device. The developing device preferably has, for example, a stirrer for charging the toner by friction agitation, a magnetic field generator fixed inside, and a developer carrier capable of rotating while carrying a developer containing toner on a surface thereof.

The image forming apparatus according to the embodiment may be provided with five developing units. The developing units store black, cyan, magenta, and yellow color toners and the toner according to the embodiment. The toner according to the embodiment may be any color, but preferably transparent or white. In the developing unit, the toner according to the embodiment may be some or all of the color toners of black, cyan, magenta and yellow.

(Transfer Unit)

The transfer unit preferably includes a primary transfer unit which transfers a toner image onto an intermediate transfer body to form a composite transfer image, and a secondary transfer unit which transfers the composite transfer image onto a recording medium. Incidentally, the intermediate transfer body is not particularly limited, and can be appropriately selected from the publicly known transfer bodies depending on the purpose. For example, a transfer belt is preferably included.

The transfer units (the primary transfer unit and the secondary transfer unit) preferably include at least a transfer device that releases the toner image formed on the electrostatic latent image carrier (photosensitive element) and charges the toner image to the recording medium. One transfer unit may be provided, or two or more transfer units may be provided.

Suitable transfer units may include, for example, a corona transfer unit by using corona discharge phenomena, a transfer belt, a transfer roller, a pressure transfer roller, and an adhesive transfer device.

The recording medium is typically plain paper, but is not particularly limited as long as an unfixed image after development can be transferred to the recording medium. The recording medium can be appropriately selected according to the purpose. A PET base for OHP or the like can be used for the recording medium.

(Fixing Unit)

The fixing unit is not particularly limited, and can be appropriately selected depending on the purpose. A known heating pressure unit is preferably used. Suitable heating pressure units may include, for example, a combination of a heating roller and a pressurizing roller, a combination of a heating roller, a pressurizing roller, and an endless belt.

The fixing unit preferably includes a heating body including a heating element, a film being in contact with the heating body, and a pressing member being in pressure contact with the heating body via the film. The fixing unit is preferably a heating and pressurizing unit in which a recording medium on which an unfixed image is formed is passed between the film and the pressing member, and which heats the recording medium so as to fix the unfixed image.

Preferably, heating in the heating and pressurizing unit is typically performed at a temperature within a range from 80° C. to 200° C.

The surface pressure of the heating and pressurizing unit is not particularly limited, and may be appropriately selected depending on the purpose. The surface pressure is preferably within a range from 10 $N/cm^2$ to 80 $N/cm^2$.

In this embodiment, for example, a known optical fixing device may be used with the fixing unit or instead of the fixing unit depending on the purpose.

(Others)

The image forming apparatus according to the embodiment may include, for example, a discharging unit, a recycling unit, or a controller.

((Discharging Unit))

The discharging unit is not particularly limited as long as a discharging bias is applied to the electrostatic latent image carrier. The discharging unit can be appropriately selected from known discharging devices. For example, a discharging lamp is preferably included.

((Cleaning Unit))

The cleaning unit is not particularly limited as long as toner remaining on the electrostatic latent image carrier can be removed, and may be appropriately selected from known cleaning devices. Suitable cleaning units may include, for example, a magnetic brush cleaner, an electrostatic brush cleaner, a magnetic roller cleaner, a blade cleaner, a brush cleaner, and a web cleaner.

The image forming apparatus according to the embodiment may have a cleaning unit to improve cleaning performance. That is, by controlling the adhesion between toners, fluidity of the toner is controlled and the cleaning property can be improved. Further, by controlling characteristics of the toner after deterioration, excellent long-life cleaning quality can be maintained even under severe conditions such as high temperature and humidity. Furthermore, since external additive can be sufficiently released from the toner on the photosensitive element, by forming an external additive deposition layer (dam layer) in the cleaning blade nip part, a high cleaning property can be achieved.

((Recycling Unit))

The recycling unit is not particularly limited, and includes a conventional conveying means or the like.

((Controller))

The controller can control the movement of each of the above-described parts. The controller is not particularly limited, as long as the movement of each of the above-described parts can be controlled, and the controller can be appropriately selected depending on the purpose. Suitable controllers may include, for example, a control device, such as a sequencer, and a computer.

Since the image forming apparatus according to the embodiment can perform image forming using the toner according to the embodiment, the image forming apparatus has excellent fixability to a plastic film. Thus, the image forming apparatus can reduce power consumption, and provide a high image quality stably.

<Image Forming Method>

The image forming method according to the embodiment includes: an electrostatic latent image forming step of forming an electrostatic latent image on an electrostatic latent image carrier; and a developing step of developing the electrostatic latent image using a toner to form a toner image. The image forming method may further include other steps as required. The image forming method can be preferably performed by the image forming apparatus. The electrostatic latent image forming step can be preferably performed by the electrostatic latent image forming unit, the developing step can be preferably performed by the developing unit, and the other step can be preferably performed by the other unit.

The image forming method according to the embodiment more preferably includes, in addition to the above-described electrostatic latent image forming step and the developing step, a transfer step of transferring a toner image to a recording medium and a fixing step of fixing the transfer image transferred to a surface of the recording medium.

The toner according to the embodiment is used in the developing step. Preferably, the toner image may be formed by using a developer containing the toner according to the embodiment and optionally containing other components such as a carrier.

The electrostatic latent image forming step is a step of forming an electrostatic latent image on the electrostatic latent image carrier, and includes a charging step of charging a surface of the electrostatic latent image carrier, and an exposure step of exposing the charged surface of the electrostatic latent image carrier to form an electrostatic latent image. The surface of the electrostatic latent image carrier can be charged, for example, by applying a voltage to the surface of the electrostatic latent image carrier using a charging device. The charged surface of the electrostatic latent image carrier can be exposed, for example, by imagewise exposing the surface of the electrostatic latent image carrier using an exposure device. The electrostatic latent image can be formed, for example, by uniformly charging the surface of the electrostatic latent image carrier and exposing the surface in an image-like manner, which can be performed by an electrostatic latent image forming unit.

The developing step is a step of sequentially developing the electrostatic latent image with a plurality of colors of toner to form the toner image. The toner image can be formed, for example, by developing an electrostatic latent image using the toners, and can be performed by a developing device.

In the developing device, for example, the toner and the carrier are mixed and stirred, the toner is charged due to friction, the toner is held on a surface of the rotating magnet roller in a pointing state, and a magnetic brush is formed. Since the magnet roller is disposed near the electrostatic latent image carrier (photosensitive element), a part of the toner constituting the magnetic brush formed on the surface of the magnet roller moves to the surface of the electrostatic latent image carrier (photosensitive element) due to an electrical attractive force. As a result, the electrostatic latent image is developed by the toner, and the toner image is formed on the surface of the electrostatic latent image carrier (photosensitive element).

The transfer step is a step of transferring the toner image to the recording medium. In the transfer step, an intermediate transfer body is preferably used, so that the toner image is primarily transferred to the intermediate transfer body, and then the toner image is secondarily transferred to the recording medium. The transfer step more preferably includes the primary transfer step of transferring the toner image to the intermediate transfer body to form a composite transfer image using two or more colors of toner, preferably the full color toner, and a secondary transfer step of transferring the composite transfer image to the recording medium. The above-described transfer process can be performed, for example, by charging the electrostatic latent image carrier (photosensitive element) with the toner image using a transfer charger. The transfer step can be performed by the transfer unit.

The fixing step is a step of fixing the toner image transferred to the recording medium using the fixing device. The toner image may be fixed each time transferred to the recording medium for each color developer, or the fixing process may be simultaneously performed for laminated toner images transferred to the recording medium for the developers of the respective colors.

The image forming method according to the embodiment may further include other steps as optionally selected, for example, a discharging step, a cleaning step, or a recycling step.

The discharging step is a step of performing a discharging process by applying a discharging bias to the electrostatic latent image carrier, and is preferably performed by the discharging unit.

The cleaning step is a step of removing the toner remaining on the electrostatic latent image carrier, and the cleaning step can be preferably performed by the cleaning unit.

The recycling step is a step of recycling the toner removed by the cleaning step to the developing unit, and is preferably performed by the recycling unit.

Since the image forming method according to the embodiment can perform an image forming process using the toner according to the embodiment, the image forming method has excellent fixability to a plastic film. Thus, the image forming method can reduce power consumption, and provide a high image quality stably.

[Embodiment of the Image Forming Apparatus]

Next, one aspect of the image forming apparatus according to the embodiment will be described with reference to FIG. 1. FIG. 1 is a schematic diagram illustrating an example of the image forming apparatus according to the embodiment. In FIG. 1, the toner according to the embodiment is white. The developing unit and the primary transfer roller of the toner according to the embodiment are omitted.

As illustrated in FIG. 1, the image forming apparatus 1A includes five developing units 10Y, 10C, 10M, 10K, and 10A (not shown) of toners of yellow (Y), cyan (C), magenta (M), black (K), and white (A), an intermediate transfer belt 20 that is an intermediate transfer body, an exposure device 30 as an exposure unit, primary transfer rollers 40Y, 40C, 40M, 40K, and 40A (not shown), a secondary transfer device 50, an intermediate transfer body cleaning device 60, a paper feed unit 70, a resist roller 80, and a fixing device 90 as the fixing unit. The image forming apparatus 1A is a so-called tandem type image forming apparatus in which yellow, cyan, magenta, black, and white color toner images formed by the developing units 10Y, 10C, 10M, 10K, and 10A are superimposed on each other to form a full color image.

The five developing units 10Y, 10C, 10M, 10K, and 10A (not shown) are arranged in parallel. The sequence of the developing units 10Y, 10C, 10M, 10K, and 10A (not shown) is not particularly limited to this order.

The developing units 10Y, 10C, 10M, 10K, and 10A (not shown) include photoreceptor drums 11Y, 11C, 11M, 11K, and 11A (not shown) that are rotationally driven as electrostatic latent image carriers, respectively.

Figure 2:
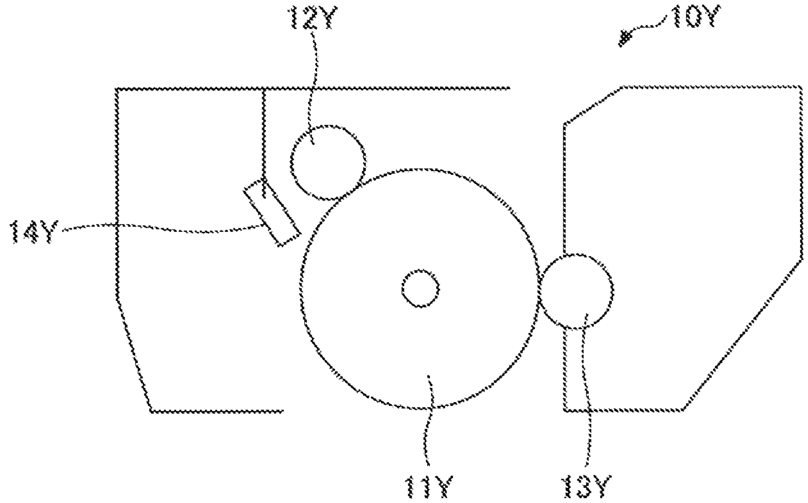
FIG. 2 is a schematic view for explaining a developing unit.

FIG. 2 is a schematic diagram for explaining the developing unit 10Y, 10C, 10M, 10K, and 10A (not shown). With reference to FIG. 2, the developing unit 10Y will be described. However, other developing units 10C, 10M, 10K, and 10A have the same configuration and perform the same operation as the developing unit 10Y. As illustrated in FIG. 2, the developing unit 10Y includes devices performing electrophotographic processes, such as a charging device 12Y, a developing device 13Y, and a cleaning device 14Y, around the photoreceptor drum 11Y.

The developing units 10Y, 10C, 10M, 10K, and 10A (not shown) may be integrally formed and may be a process cartridge detachable from the main body of the image forming apparatus 1A.

As illustrated in FIG. 1, the intermediate transfer belt 20 is an endless belt stretched by four rollers 21 disposed inside the belt and is designed to be moved in the arrow direction by the four rollers 21. The intermediate transfer belt 20 is disposed so as to be capable of moving the surfaces of the developing unit 10Y, 10C, 10M, 10K, and 10A (not shown) to face the developing unit 10Y, 10C, 10M, 10K, and 10A (not shown).

The exposure device 30 is disposed near the lower part of the developing units 10Y, 10C, 10M, 10K, and 10A (not shown). The exposure device 30 emits laser light or LED light to the photoreceptor drums 11Y, 11C, 11M, 11K, and 11A (not shown) based on image information of the colors to form latent images of the colors, respectively.

The primary transfer rollers 40Y, 40C, 40M, 40K, and 40A (not shown) are disposed at positions opposite to the photoreceptor drums 11Y, 11C, 11M, 11K, and 11A (not shown) via the intermediate transfer belt 20, respectively. The primary transfer rollers 40Y, 40C, 40M, 40K, and 40A (not shown) transfer the toner images of the colors formed on the photoreceptor drums 11Y, 11C, 11M, 11K, and 11A (not shown), respectively, to the intermediate transfer belt 20.

The primary transfer rollers 40Y, 40C, 40M, 40K, and 40A (not shown) sequentially transfer the color toner images formed by the developing units 10Y, 10C, 10M, 10K, and 10A (not shown), respectively, onto the intermediate transfer belt 20, and superimpose them, to form a full color image.

The secondary transfer device 50 is disposed on the downstream side of the primary transfer rollers 40Y, 40C, 40M, 40K, and 40A (not shown) in the surface moving direction of the intermediate transfer belt 20. The secondary transfer device 50 transfers a developing image (toner image) on the intermediate transfer belt 20 to a plastic film that is a recording medium (secondary transfer).

The intermediate transfer body cleaning device 60 is disposed near the intermediate transfer belt 20 and is disposed on the downstream side from the secondary transfer apparatus 50 in the surface moving direction of the intermediate transfer belt 20. The intermediate transfer body cleaning device 60 removes the toner remaining on the surface of the intermediate transfer belt 20.

The paper feed unit 70 is provided in the lower part of the developing units 10Y, 10C, 10M, 10K, and 10A (not shown). The paper feed unit 70 includes a feed cassette 71 and a feed roller 72 to feed a plastic film toward the resist roller 80.

The resist roller 80 feeds the transfer sheet toward the opposite part of the intermediate transfer belt 20 and the secondary transfer device 50 in accordance with the timing of forming the toner image.

The fixing device 90 heats and presses a white toner image and a full color toner image transferred onto the plastic film and fixes the toner images.

Next, a method of forming an image on a plastic film using the image forming apparatus 1A will be described. As shown in FIG. 1, first, the surfaces of the photoreceptor drums 11Y, 11C, 11M, 11K, and 11A (not shown) are uniformly charged using the charging devices 12Y, 12C (not shown), 12M (not shown), 12K (not shown), and 12A (not shown) of the developing unit 10Y, 10C, 10M, 10K, and 10A (not shown), and then the photoreceptor drums 11Y, 11C, 11M, 11K, and 11A (not shown) are exposed with the exposure light using the exposure device 30 to form an electrostatic latent image. Next, the electrostatic latent images formed on the photoreceptor drums 11Y, 11C, 11M, 11K, and 11A (not shown) are developed with toners supplied from the developing devices 13Y, 13C (not shown), 13M (not shown), 13K (not shown), and 13A (not shown) to form toner images. The toner images formed on the photoreceptor drums 11Y, 11C, 11M, 11K, and 11A (not shown)

are transferred (primary transfer) to the intermediate transfer belt 20 by the transfer bias applied from the primary transfer rollers 40Y, 40C, 40M, 40K, and 40A, and a white toner image and a full color toner image are formed on the intermediate transfer belt 20. Thereafter, the white toner image and the full color toner image on the intermediate transfer belt 20 are transferred (secondarily transferred) to the plastic film fed by the paper feed unit 70 by the transfer bias applied from the secondary transfer device 50.

After completion of the secondary transfer, the transferred plastic film is conveyed to the fixing device 90, and the transferred white toner image and the full color toner image are fixed to the plastic film by the fixing device 90, and then ejected to the outside.

Moreover, after the toners remaining on the surface of the photoreceptor drums 11Y, 11C, 11M, 11K, and 11A (not shown), on which the toner image has been transferred to the intermediate transfer belt 20, are eliminated by the cleaning devices 14Y, 14C (not shown), 14M (not shown), 14K (not shown), and 14A (not shown), respectively, the photoreceptor drums are discharged by the discharging lamp (not shown). Residual toner on the intermediate transfer belt 20 after image transfer is removed by the intermediate transfer body cleaning device 60.

Figure 3:
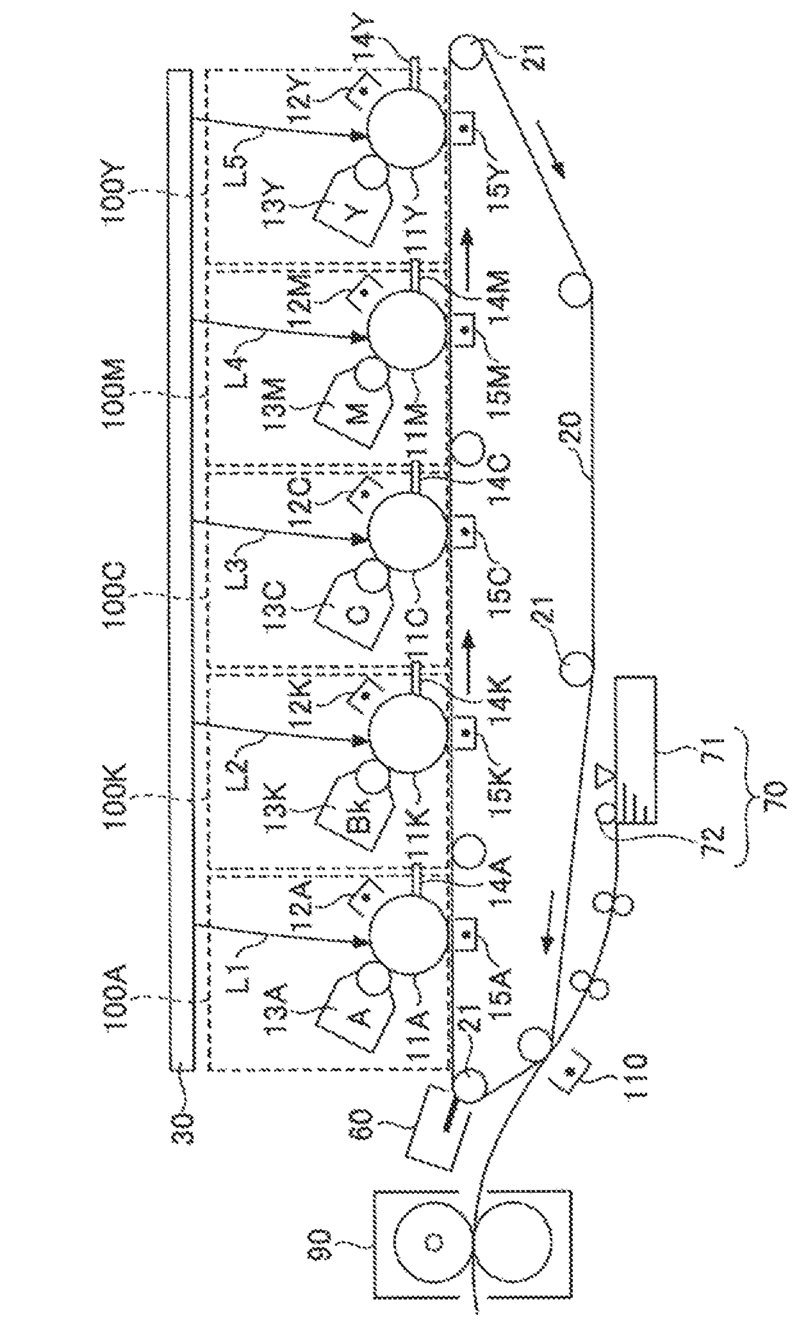
FIG. 3 is a schematic view illustrating an example of another configuration of the image forming apparatus according to the embodiment of the present disclosure.

FIG. 3 is a schematic diagram illustrating another example of the image forming apparatus according to the embodiment. In FIG. 3, the developing unit of the toner according to the embodiment is also shown. The description of the same configuration as that of the image forming apparatus 1A illustrated in FIG. 1 will be omitted. As illustrated in FIG. 3, the image forming apparatus 1B includes five developing units 100A, 100K, 100C, 100M, and 100Y of the toner of white (A), black (K), cyan (C), magenta (M), and yellow (Y), an intermediate transfer belt 20 as an intermediate transfer body, an exposure device 30 as an exposure unit, an intermediate transfer body cleaning device 60, a paper feed unit 70, a fixing device 90 as a fixing unit, and a transfer device 110. In FIG. 3, the toner according to the embodiment is used for the developing unit 100A, and the toner according to the embodiment is white.

The developing units 100A, 100K, 100C, 100M, and 100Y include photoreceptor drums 11A, 11K, 11C, 11M, and 11Y; charging devices 12A, 12K, 12C, 12M, and 12Y; developing devices 13A, 13K, 13C, 13M, and 13Y; cleaning devices 14A, 14K, 14C, 14M, and 14Y; and transfer chargers as charging devices 15A, 15K, 15C, 15M, and 15Y, respectively.

The developing units 100A, 100K, 100C, 100M, and 100Y are disposed around the photoreceptor drums 11A, 11K, 11C, 11M, and 11Y, respectively, with the charging devices 12A, 12K, 12C, 12M, and 12Y, the developing devices 13A, 13K, 13C, 13M, and 13Y, the cleaning devices 14A, 14K, 14C, 14M, and 14Y, and the transfer chargers 15A, 15K, 15C, 15M, and 15Y. Further, in the developing units 100A, 100K, 100C, 100M, and 100Y, the photoreceptor drums are exposed with the exposure light (L1, L2, L3, L4, and L5) based on image information of the respective colors by the exposure devices 30, and electrostatic latent images of the respective colors are formed on the photoreceptor drums 11A, 11K, 11C, 11M, and 11Y.

Since in the image forming apparatus 1B, the developing unit 100A includes the toner according to the embodiment, the developing unit 100A is preferably disposed on the upstream side of the other developing units 100K, 100C, 100M, and 100Y in the surface moving direction of the intermediate transfer belt 20. Thus, the toner image according to the embodiment can be formed the nearest to the plastic film side.

The intermediate transfer belt 20 is an endless belt stretched by seven rollers 21 disposed inside thereof and is designed to move in the arrow direction by the seven rollers 21. The intermediate transfer belt 20 is disposed to move on the surfaces of the photoreceptor drums 11A, 11K, 11C, 11M, and 11Y so as to face the photoreceptor drums 11A, 11K, 11C, 11M, and 11Y, respectively.

The exposure device 30 is provided at the top of each developing unit. The exposure device 30 emits laser light or LED light on the photoreceptor drums 11A, 11K, 11C, 11M, and 11Y based on image information of the colors, to form latent images of the colors, respectively.

The intermediate transfer body cleaning device 60 is disposed near the intermediate transfer belt 20 and is disposed on the downstream side of the transfer device 110 in the surface moving direction of the intermediate transfer belt 20. The intermediate transfer body cleaning device 60 removes the toner remaining on the surface of the intermediate transfer belt 20.

The transfer device 110 is disposed on the downstream side of each developing unit in the surface moving direction of the intermediate transfer belt 20. The transfer device 110 transfers (secondary transfer) the developing image (toner image) on the intermediate transfer belt 20 to a plastic film that is a recording medium.

Since the paper feed unit 70 and the fixing device 90 are the same as those of the image forming apparatus 1A illustrated in FIG. 1, detailed descriptions thereof will be omitted.

In the image forming apparatus 1B, the developing unit 100A develops with white toner, the developing unit 100K develops with black toner, the developing unit 100C develops with cyan toner, the developing unit 100M develops with magenta toner, and the developing unit 100Y develops with yellow toner on the photoreceptor drums 11A, 11K, 11C, 11M, and 11Y to form white toner images and color toner images, respectively. Thereafter, the white toner images and the color toner images developed on the photoreceptor drums 11A, 11K, 11C, 11M, and 11Y are transferred (primary transfer) to the intermediate transfer belt 20. The white toner image and the full color toner image transferred to the intermediate transfer belt 20 are transferred (secondarily transferred) to the plastic film by the transfer device 110 and fixed by the fixing device 90.

EXAMPLE

Hereinafter, practical examples and comparative examples will be shown and the embodiments will be described in further detail. However, the embodiments are not limited by these practical examples and comparative examples.

<Preparation of Transparent Toner>

Example 1

The following toner raw materials were pre-mixed using a hen-shell mixer (FM20B, manufactured by Japan Coke Industry Co., Ltd.), melted and kneaded by a single-axis kneader (Coneida kneader BUSS Conneder "MDK46-11D," manufactured by Buss Corporation) at a feed rate of 16 kg/h to the barrel, a screw temperature of 40° C., and a kneading temperature of 100° C. to 130° C. (zone barrel temperature: Z1 zone 130° C., Z2Z3 zone 100° C.). The resulting kneaded material was cooled to room temperature and crude triturated to 200 μm to 300 μm with rotoplex. Then, a counter jet mill (100AFG, manufactured by Hosokawa Micron Co., Ltd.) was used to pulverize the particles with an average mass particle diameter of (6.2±0.3) μm by adjusting the pulverizing air pressure accordingly. Thereafter, the finely pulverized kneaded material was classified by using an air flow classifier (EJ-LABO, manufactured by Matubau Co., Ltd.) while appropriately adjusting the opening of the louver so that the mass average particle diameter was (7.0±0.2) μm and the ratio of the mass average particle diameter to the number average particle diameter was less than or equal to 1.20, and the parent toner particles were obtained. Then, for 100 parts by weight of the parent toner particles, 1.0 part by weight of an additive (HDK-2000 (TM), manufactured by Clariant Co., Ltd.) and 1.0 part by weight of an additive (H05TD (TM), manufactured by Clariant Co., Ltd.) were stirred and mixed using a Henschel mixer. Therefore, the toner 1 that is the transparent toner is manufactured.

(Toner Raw Material)

- Polyester resin 1 (EXL-101, manufactured by Sanyo Chemical Co., Ltd): 67 parts by mass;
- Polyester resin 2 (RN-290, Kao): 20 parts by mass;
- Ester wax (WEP-5, Nippon Oil & Fat Co., Ltd.): 5 parts by mass;
- Maleic acid modified polyolefin with a polypropylene block in a main chain 1 (TOYOTAC-KH, Toyobo Corporation, melting point 80° C., weight average molecular weight 90000): 8 parts by mass; and
- Pigment (titanium oxide (PF-739, Ishihara Sangyo Co.)): 65 parts by mass.

As a result of performing DSC for the maleic acid modified polyolefin 1, it was confirmed that there was no exothermic peak in the cooling process of the polyolefin by the DSC after the first heating process of the polyolefin in the DSC, and that there was an exothermic peak in the range from 0° C. to 30° C. in the second heating process of the polyolefin by the DSC.

As a result of performing the DSC for the obtained toner 1, it was confirmed that the obtained toner has an exothermic peak in the range from 40° C. to 70° C. in the cooling process of the polyolefin by the DSC after the first heating process of the polyolefin by the DSC.

Example 2

Toner 2, which is a transparent toner, was manufactured in the same manner as Example 1, except that the toner raw material was changed to the following toner raw material.

(Toner Raw Material)

- Polyester resin 1 (EXL-101, manufactured by SANYO CHEMICAL Co., Ltd.): 55 parts by mass;
- Polyester resin 2 (RN-290, Kao): 20 parts by mass;
- Ester wax (WEP-5, Nippon Oil & Fat Co., Ltd.): 5 parts by mass;
- Maleic acid modified polyolefin with a polypropylene block in a main chain 1 (TOYOTAC-KH, Toyobo Corporation, melting point 80° C., weight average molecular weight 90000): 20 parts by mass; and
- Pigment (titanium oxide (PF-739, Ishihara Sangyo Co.)): 65 parts by mass.

As a result of performing the DSC for the obtained toner 2, it was confirmed that the obtained toner has an exothermic peak in the range from 40° C. to 70° C. in the cooling process of the polyolefin by the DSC after the first heating process of the polyolefin by the DSC.

Example 3

The toner 3, which is a transparent toner, was manufactured in the same manner as Example 1 except that the toner raw material was changed to the following toner raw material.

(Toner Raw Material)

- Polyester resin 1 (EXL-101, manufactured by SANYO CHEMICAL Co., Ltd.): 44 parts by mass;
- Polyester resin 2 (RN-290, Kao): 20 parts by mass;
- Paraffin wax (HNP-9, manufactured by Nippon Seiwax Co., Ltd.): 5 parts by mass;
- Maleic acid modified polyolefin with a polypropylene block in a main chain 1 (TOYOTAC-KH, Toyobo Corporation, melting point 80° C., weight average molecular weight 90000): 31 parts by mass; and
- Pigment (titanium oxide (PF-739, Ishihara Sangyo Co.)): 65 parts by mass.

As a result of performing the DSC for the obtained toner 3, it was confirmed that the obtained toner has an exothermic peak in the range from 40° C. to 70° C. in the cooling process of the polyolefin by the DSC after the first heating process of the polyolefin by the DSC.

Example 4

The toner 4, which is a transparent toner, was manufactured in the same manner as Example 1, except that the toner raw material was changed to the following toner raw material.

(Toner Raw Material)

- Polyester resin 1 (EXL-101, manufactured by Sanyo Chemical Co., Ltd): 72.9 parts by mass;
- Polyester resin 2 (RN-290, manufactured by Kao Corporation): 20 parts by mass;
- Ester wax (WEP-5, Nippon Oil & Fat Co., Ltd.): 5 parts by mass;
- Maleic acid modified polyolefin with a polypropylene block in a main chain 1 (TOYOTAC-KH, Toyobo Corporation, melting point 80° C., weight average molecular weight 90000): 2.1 parts by mass; and
- Pigment (titanium oxide (PF-739, Ishihara Sangyo Co.)): 65 parts by mass.

As a result of performing the DSC for the obtained toner 4, it was confirmed that the obtained toner has an exothermic peak in the range from 40° C. to 70° C. in the cooling process of the polyolefin by the DSC measurement after the first heating process of the polyolefin by the DSC.

Example 5

The toner 5, which is a transparent toner, was manufactured in the same manner as Example 1, except that the toner raw material was changed to the following toner raw material.

(Toner Raw Material)

- Polyester resin 1 (EXL-101, manufactured by Sanyo Chemical Co., Ltd): 67 parts by mass;
- Polyester resin 2 (RN-290, Kao): 20 parts by mass;
- Ester wax (WEP-5, Nippon Oil & Fat Co., Ltd.): 5 parts by mass;
- Maleic acid modified polyolefin with a polypropylene block in a main chain 2 (TOYOTAC-KE, Toyobo Corporation, melting point 80° C., weight average molecular weight 60000): 8 parts by mass; and
Pigment (titanium oxide (PF-739, Ishihara Sangyo Co.)): 65 parts by mass.

As a result of performing the DSC for maleic acid modified polyolefin 2, it is confirmed that there was no exothermic peak in the cooling process of the polyolefin by the DSC after the first heating process of the polyolefin in the DSC, and that there was an exothermic peak in the range from 0° C. to 30° C. at the second heating process of the polyolefin by the DSC.

When the obtained toner 5 was measured by DSC, it was confirmed that the obtained toner has an exothermic peak in the range from 40° C. to 70° C. in the cooling process of the polyolefin by the DSC measurement after the first heating process of the polyolefin by the DSC.

Comparative Example 1

The toner 6, which is a transparent toner, was manufactured in the same manner as Example 1, except that the toner raw material was changed to the following toner raw material.

(Toner Raw Material)
Polyester resin 1 (EXL-101, manufactured by Sanyo Chemical Co., Ltd): 75 parts by mass;
Polyester resin 1 (RN-290, Kao): 20 parts by mass;
Ester wax (WEP-5, Nippon Oil & Fat Co., Ltd.): 5 parts by mass; and
Pigment (titanium oxide (PF-739, Ishihara Sangyo Co.)): 65 parts by mass.

When the obtained toner 6 was measured by DSC, it was confirmed that the obtained toner has an exothermic peak in the range from 40° C. to 70° C. in the cooling process of the polyolefin by the DSC measurement after the first heating process of the polyolefin by the DSC.

Comparative Example 2

The toner 7, which is a transparent toner, was manufactured in the same manner as Example 1, except that the toner raw material was changed to the following toner raw material.

(Toner Raw Material)
Polyester resin 1 (EXL-101, manufactured by Sanyo Chemical Co., Ltd): 73 parts by mass;
Polyester resin 2 (RN-290, Kao): 20 parts by mass;
Ester wax (WEP-5, Nippon Oil & Fat Co., Ltd.): 5 parts by mass;
Maleic acid modified polyolefin with a polypropylene block in a main chain 1 (TOYOTAC-KH, Toyobo Corporation, melting point 80° C., weight average molecular weight 90000): 2 parts by mass; and
Pigment (titanium oxide (PF-739, Ishihara Sangyo Co.)): 65 parts by mass.

When the obtained toner 7 was measured by DSC, it was confirmed that the obtained toner has an exothermic peak in the range from 40° C. to 70° C. in the cooling process of the polyolefin by the DSC measurement after the first heating process of the polyolefin by the DSC.

Comparative Example 3

The toner 8, which is a transparent toner, was manufactured in the same manner as Example 1, except that the toner raw material was changed to the following toner raw material.

(Toner Raw Material)
Polyester resin 1 (EXL-101, manufactured by Sanyo Chemical Co., Ltd): 67 parts by mass;
Polyester resin 2 (RN-290, Kao): 20 parts by mass;
Ester wax (WEP-5, Nippon Oil & Fat Co., Ltd.): 5 parts by mass;
Maleic acid modified polyolefin with polypropylene block in a main chain 3 (TOYOTAC-F2, Toyobo Corporation, melting point 125° C., weight average molecular weight 70000): 8 parts by mass; and
Pigment (titanium oxide (PF-739, Ishihara Sangyo Co.)): 65 parts by mass.

As a result of performing the DSC for maleic acid modified polyolefin 3, it is confirmed that there was an exothermic peak in the cooling process of the polyolefin by the DSC after the first heating process of the polyolefin by the DSC and that there was no exothermic peak in the range from 0° C. to 30° C. at the second heating process of the polyolefin by the DSC.

The obtained toner 8 was measured by DSC, and it was confirmed that the obtained toner had an exothermic peak in the range from 40° C. to 70° C. in the cooling process of the polyolefin by the DSC after the first heating process of the polyolefin by the DSC measurement.

Comparative Example 4

The toner 9, which is a transparent toner, was manufactured in the same manner as Example 1, except that the toner raw material was changed to the following toner raw material.

(Toner Raw Material)
Polyester resin 1 (EXL-101, manufactured by Sanyo Chemical Co., Ltd): 67 parts by mass;
Polyester resin 2 (RN-290, Kao): 20 parts by mass;
Ester wax (WEP-5, Nippon Oil & Fat Co., Ltd.): 5 parts by mass;
Maleic acid-modified polyolefin with a polypropylene block in a main chain 4 (TOYOTAC-H3000P, Toyobo Corporation, melting point 137° C., weight average molecular weight 200000): 8 parts by mass; and
Pigment (titanium oxide (PF-739, Ishihara Sangyo Co.)): 65 parts by mass.

As a result of performing the DSC for maleic acid modified polyolefin 4, it is confirmed that there was an exothermic peak in the cooling process of the polyolefin by the DSC after the first heating process of the polyolefin in the DSC and that there was no exothermic peak in the range from 0° C. to 30° C. at the second heating process of the polyolefin by the DSC.

When the obtained toner 9 was measured by DSC, it was confirmed that the obtained toner had an exothermic peak in the range from 40° C. to 70° C. in the cooling process of the polyolefin by the DSC after the first heating process of the polyolefin by the DSC measurement.

Comparative Example 5

The toner 10, which is a transparent toner, was manufactured in the same manner as Example 1, except that the toner raw material was changed to the following toner raw material.

(Toner Raw Material)
Polyester resin 1 (EXL-101, manufactured by Sanyo Chemical Co., Ltd): 93 parts by mass;
Ester wax 2 (WEP-5, manufactured by Nippon Oil & Fat Co., Ltd): 5 parts by mass;

Maleic acid-modified polyolefin 5 with a polypropylene block in a main chain 5 (YUMEX 100TS, SANYO CHEMICAL Co., Ltd., melting point 136° C., weight average molecular weight 9000): 8 parts by mass; and Pigment (titanium oxide (PF-739, Ishihara Sangyo Co.)): 65 parts by mass.

As a result of performing the DSC for maleic acid modified polyolefin 5 confirmed that there was an exothermic peak in the cooling process of the polyolefin by the DSC after the first heating process of the polyolefin in the DSC and that there was no exothermic peak in the range from 0° C. to 30° C. at the second heating process of the polyolefin by the DSC.

When the obtained toner 10 was measured by DSC, it was confirmed that the obtained toner had an exothermic peak in the range from 40° C. to 70° C. in the cooling process of the polyolefin by the DSC after the first heating process of the polyolefin by the DSC measurement.

<Preparation of Two-Component Developer>

[Preparation of Carrier]

A mixture of the following carrier raw materials was dispersed in a homomixer for 20 minutes to prepare a coating layer forming solution. The coating layer forming liquid was applied on Mn ferrite particles having a mass average particle diameter of 35 μm as the core material using a fluidized bed coating apparatus so as to have an average film thickness of 0.20 μm at the core material surface by controlling the temperature in the fluidized tank to 70° C., and then dried. The resulting carrier was baked in the electric furnace at 180° C. for 2 hours to obtain carriers A.

(Materials for Carriers)

Silicone resin (organostrate silicone): 100 parts by mass;

Toluene: 100 parts by mass;

γ-(2-Aminoethyl) aminopropyltrimethoxysilane: 5 parts by mass; and

Carbon black: 10 parts by mass.

[Preparation of Two-Component Developer]

One of the transparent toners 1 to 10, the color toner, and the carrier A were uniformly mixed with a Turbula mixer (manufactured by Willie-E. Bachofen (WAB)) at 48 rpm for 5 minutes to charge, thereby preparing a two-component developer. They were mixed with the ratio of the transparent toner or the color toner to the carrier A that was adjusted to the toner concentration (7 wt. %) of the initial developer of the evaluator.

<Evaluation>

[Preparation of Fixing Solid Image]

The prepared two-component developer was set to the fifth station of the RICOH Pro C7200S (manufactured by Ricoh Co., Ltd.), and the development and transfer conditions were controlled by the process controller to achieve a toner adhesion amount of 0.40 mg/cm$^2$, and an unfixed white solid image of toners 1 to 10 was output on FASSON 2M MET BOPP UVIJ/S7000/1 (SPEC #79631) (manufactured by FASSON Co., Ltd.). The toner adhesion amount means an amount of toner adhered to FASSON 2M MET BOPP UVIJ/S7000/1 (SPEC #79631) after the development process and the transfer process.

Then, the process controller adjusted the development and the transfer conditions so that the toner adhesion amount of the magenta color toner provided in the RICOH Pro C7200S on the unfixed white solid image was 0.80 mg/cm$^2$, and a two-color superimposed unfixed solid image of magenta and white was output.

Then, the fixing temperature of the unfixed solid image was changed in steps of 5° C. in the range from 130° C. to 200° C. by the process controller to prepare a fixed image of the unfixed solid image.

[Evaluation of Fixing Strength]

The fixing strength of the fixed image was evaluated when the fixing temperature of the unfixed solid image was changed in steps of 5° C. in the range from 130° C. to 200° C. by the process controller.

(Method for Evaluating Fixing Strength)

Figure 4:
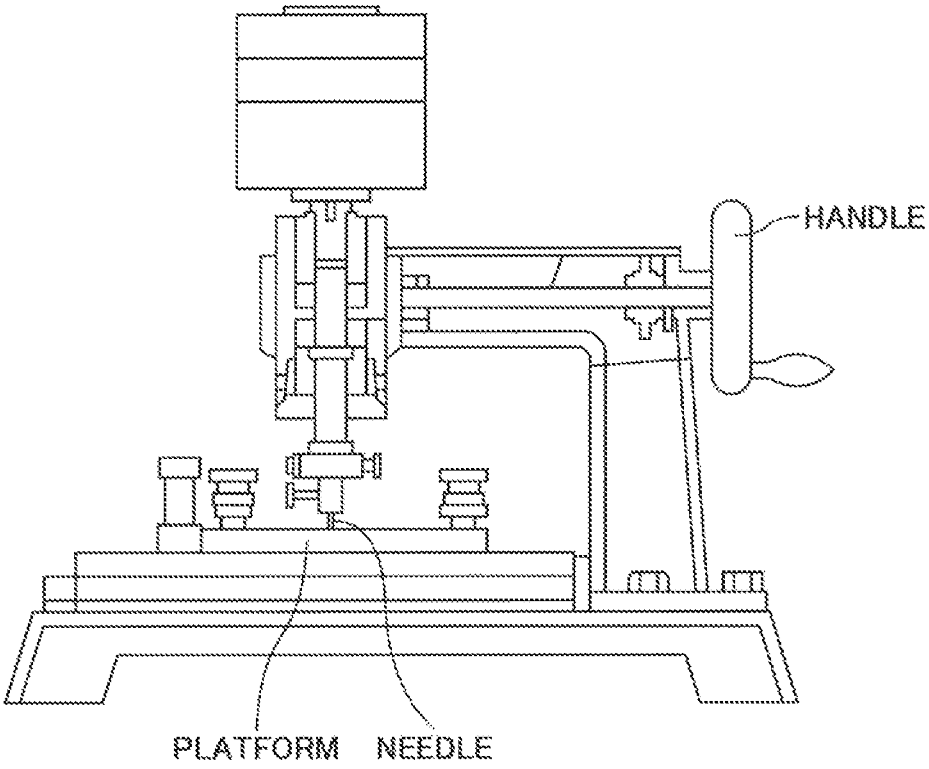
FIG. 4 is a diagram schematically illustrating an example of a drawing tester used for evaluating a fixing strength.

FIG. 4 is a diagram showing an example of a drawing tester used for evaluating the fixing strength. As shown in FIG. 4, the obtained fixed image was placed on a loading platform, and the needle was contacted to the surface of the fixed image, and a load of 50 g was applied, then the handle was rotated five times in one direction at a rate of once to twice per second to draw a helix. After the drawing test, the image was rubbed against a sponge cloth or the like about three times in a strong manner, and scraped toner was removed. If a base material was not exposed due to the drawing operation, the result of the test was decided as OK. The temperature, at which the result of the drawing test was decided as OK, was used for the evaluation of the fixing strength according to the following criteria.

((Evaluation Criteria))

A: The image was fixed at the temperature lower than 150° C., and no film curl occurred during the fixing process;

B: The image was fixed at the temperature of 150° C. or higher and lower than 170° C., and film curl occurred slightly during the fixing process; and C: The image was fixed at the temperature of 170° C. or higher, and film curl occurred during the fixing process.

[Evaluation of Tape Peel Strength]

A mending tape (manufactured by Sumitomo 3M Co., Ltd.) was attached to the obtained fixed image, and then a cylindrical barrel (3 cm in diameter) of 500 g (heavy stone) was sufficiently attached to the fixed image by placing the bottom of the barrel downward. Subsequently, the mending tape was gently peeled off from the fixed image. Image density of the fixed image before and after tape application was measured using an image density measuring device (Gretag SPM50, GretagMacbeth). The image printing part was measured at three points each, and the average value was calculated as the image density. The value obtained by dividing the image density after separation by the image density before separation and multiplying by 100 ((image density after separation)/(image density before separation)×100(%)) was used as the fixing rate, and the temperature at which the fixing rate is 90% or more was used as the fixing temperature. The fixing temperature was used for the evaluation of the tape peel strength according to the following evaluation criteria.

(Evaluation Criteria)

A: Fixing temperature was lower than 150° C. and no film curl occurred during the fixing process;

B: Fixing temperature was higher than or equal to 150° C. and lower than 170° C., and film curl occurred slightly during the fixing process; and C: Fixing temperature was higher than or equal to 170° C. and film curl occurred during the fixing process.

[Evaluation of Generation Amount of Aggregates]

10 g of the toner was placed in a 50 mL container, and the amount of aggregates was measured after storage in an open state for 14 days under an environment of the temperature at 40° C. and the relative humidity of 70RH %. The generation amount of aggregates was measured by measuring the amount of toner remaining on the sieve after the above storage on a 106 μm sieve and vibrating with a vibrator for 1 minute to assess the amount of toner according to the following evaluation criteria. From the generation amount of aggregates, the heat resistant storage stability of the toner can be evaluated. Evaluation results are given in Table 1.

(Evaluation Criteria)

A: The amount of aggregates remaining on the sieve was less than 1 mg;

B: The amount of aggregates remaining on the sieve was 1 mg or more and less than 2 mg; and C: The amount of aggregates remaining on the sieve was greater than or equal to 2 mg.

Table 1 shows the components of the toner of the practical examples and comparative examples, and the evaluation results of the fixing strength, the tape peel strength, and generation amount of aggregates.

TABLE 1

| | | Ex. 1 | Ex. 2 | Ex. 3 | Ex. 4 | Ex. 5 | Comp. ex. 1 | Comp. ex. 2 | Comp. ex. 3 | Comp. ex. 4 | Comp. ex. 5 |
|---|---|---|---|---|---|---|---|---|---|---|---|
| | Toner no. | 1 | 2 | 3 | 4 | 5 | 6 | 7 | 8 | 9 | 10 |
| Contents [parts by mass] | Polyester resin 1 | 67 | 55 | 44 | 72.9 | 67 | 75 | 73 | 67 | 67 | 67 |
| | Polyester resin 2 | 20 | 20 | 20 | 20 | 20 | 20 | 20 | 20 | 20 | 20 |
| | Ester wax | 5 | 5 | 0 | 5 | 5 | 5 | 5 | 5 | 5 | 5 |
| | Paraffin wax | 0 | 0 | 5 | 0 | 0 | 0 | 0 | 0 | 0 | 0 |
| | Maleic acid modified polyolefin with polypropylene block in a main chain 1 | 8 | 20 | 31 | 2.1 | 0 | 0 | 2 | 0 | 0 | 0 |
| | Maleic acid modified polyolefin with polypropylene block in a main chain 2 | 0 | 0 | 0 | 0 | 8 | 0 | 0 | 0 | 0 | 0 |
| | Maleic acid modified polyolefin with polypropylene block in a main chain 3 | 0 | 0 | 0 | 0 | 0 | 0 | 0 | 8 | 0 | 0 |
| | Maleic acid modified polyolefin with polypropylene block in a main chain 4 | 0 | 0 | 0 | 0 | 0 | 0 | 0 | 0 | 8 | 0 |
| | Maleic acid modified polyolefin with polypropylene block in a main chain 5 | 0 | 0 | 0 | 0 | 0 | 0 | 0 | 0 | 0 | 8 |
| | Pf-739 | 65 | 65 | 65 | 65 | 65 | 65 | 65 | 65 | 65 | 65 |
| Presence of an exothermic peak in the range of 40° C. to 70° C. in the cooling process of the polyolefin by the DSC after the first heating process of the polyolefin by the DSC | | Yes | Yes | Yes | Yes | Yes | No | No | No | No | No |
| evaluation | Fixing strength | A | A | B | B | A | C | C | C | C | C |
| | Tape peel strength | A | A | B | A | A | C | B | A | B | C |
| | Generation amount of aggregates | A | B | B | A | A | A | A | B | B | B |

From Table 1, it was confirmed that the toner of Examples 1 to 5 satisfied the conditions for use in both the fixing strength and the tape peel strength. On the other hand, it was confirmed that the toner obtained in Comparative Examples 1 to 5 does not satisfy at least the condition for use in the fixing strength and has a practical problem.

Therefore, different from the toners of Comparative Examples 1 to 5, the toner of Examples 1 to 5 contains polyolefin having no exothermic peak in the cooling process of the polyolefin by the DSC after the first heating process of the polyolefin by the DSC, and having an exothermic peak in the range from 0° C. to 30° C. in the second heating process of the polyolefin by the DSC, and the toner has an exothermic peak in the range of 40° C. to 70° C. in the cooling process of the polyolefin by the DSC after the first heating process of the polyolefin by the DSC, and thus it can be said that the toner has excellent fixability on the plastic film and image fastness. Accordingly, the toner of Examples 1 to 5 can be effectively used as the toner forming an underlayer on a surface of a plastic film, on which an image is formed.

Although the embodiments have been described as above, the embodiments are presented by way of example and the invention is not limited by the embodiments. The embodiments may be implemented in various other forms, and various combinations, omissions, substitutions, modifications, or the like may be made without departing from the spirit of the invention. These embodiments and modifications thereof are included in the scope and gist of the invention and are included in the scope of the invention and equivalents thereto.

What is claimed is:

1. A toner comprising polyolefin, wherein the toner has an exothermic peak in a range from 40° C. to 70° C. in a cooling process of the polyolefin by differential scanning calorimetry (DSC) after a first heating process of the polyolefin by the DSC, and the polyolefin does not have an exothermic peak in the cooling process of the polyolefin by the DSC after the first heating process of the polyolefin by the DSC, and has an exothermic peak in a range from 0° C. to 30° C. in a second heating process of the polyolefin by the DSC, wherein the polyolefin is a maleic acid modified polyolefin having at least a polypropylene block in a main chain and having a melting point within a range from 65° C. to 90° C.;

a maleic acid modification rate of the maleic acid modified polyolefin with a polypropylene block in a main chain is within a range from 0.5 wt. % to 8.0 wt. %; and a content of the maleic acid modified polyolefin with a polpropylene block in a main chain in the toner is within a range from 2.1 wt. % to 30.0 wt. % further comprising at least one component selected from the group consisting of a release agent, a colorant, a charge control agent, an external additive, a fluidity improver, a cleanability improver and a magnetic material.

2. The toner according to claim 1, wherein a weight average molecular weight of the maleic acid modified polyolefin is within a range from 60000 to 100000.

3. The toner according to claim 1, wherein the toner is transparent or white.

4. A developer comprising:

the toner according to claim 1; and a carrier.

5. A toner set comprising:

a color toner containing a bonding resin and a colorant; and the toner according to claim 1.

6. A toner receiving unit receiving the toner according to claim 1.

7. An image forming apparatus comprising:

an electrostatic latent image carrier;

an electrostatic latent image forming unit that forms an electrostatic latent image on the electrostatic latent image carrier;

a developing unit that develops the electrostatic latent image using a toner to form a toner image;

a transfer unit that transfers the toner image to a recording medium; and a fixing unit that fixes an image transferred to the recording medium, wherein the toner is the toner according to claim 1.

8. The image forming apparatus according to claim 7, wherein the toner image is formed on a side nearest to the recording medium.

9. The image forming apparatus according to claim 7, wherein the recording medium is a plastic film.

10. An image forming method comprising:

forming an electrostatic latent image on an electrostatic latent image carrier;

developing the electrostatic latent image using a toner to form a toner image;

transferring the toner image to a recording medium; and fixing an image transferred to the recording medium, wherein the toner is the toner according to claim 1.

11. The toner according to claim 1, further comprising a polyester resin.

12. The toner according to claim 11, wherein said polyester resin has a glass transition temperature within a range from 50° C. to 75° C.

13. The toner according to claim 11, further comprising at least one resin selected from the group consisting of styrene, poly-α-styrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylate copolymer, styrene-methacrylate copolymer, styrene-α-methyl chloroacrylate copolymer, and styrene-acrylonitrile-acrylate copolymer, epoxy resin, vinyl chloride resin, rosin modified maleic acid resin, phenolic resin polyethylene resin, polypropylene resin, petroleum resin, polyurethane resin, ketone resin, ethylene-ethyl acrylate copolymer, xylene resin, and polyvinyl butyrate resin.

14. The toner according to claim 1, further comprising at least one release agent selected from the group consisting of liquid paraffin, microcrystalline wax, natural paraffin, synthetic paraffin, polyolefin wax, and partial oxides, fluorides, and chlorides thereof; beef fat, fish oil; coconut oil, soybean oil, rapeseed oil, rice bran wax, camauba wax; montan wax, higher aliphatic acids, aliphatic acid amide, aliphatic acid bisamide; zinc stearate, calcium stearate, magnesium stearate, aluminum stearate, zinc oleate, zinc palmitate, magnesium palmitate, zinc myristate, zinc laurate, zinc behenate, aliphatic acid esters, and polyvinylidene fluoride.

* * * * *